United States Patent [19]

Hatch et al.

[11] Patent Number: 5,657,187
[45] Date of Patent: Aug. 12, 1997

[54] LOAD BEAM HAVING TUNED RESONANCE MODE PERFORMANCE FOR SUPPORTING A READ/WRITE HEAD

[75] Inventors: Michael R. Hatch, Mountain View; Stephen P. Williams, Morgan Hill; Jwo-Min Wang, Sunnyvale, all of Calif.

[73] Assignee: Quantum Corporation, Milpitas, Calif.

[21] Appl. No.: 567,622

[22] Filed: Dec. 5, 1995

Related U.S. Application Data

[62] Division of Ser. No. 249,525, May 26, 1994, Pat. No. 5,471,734.

[51] Int. Cl.$^6$ ............................................. G11B 5/48
[52] U.S. Cl. ............................................. 360/104
[58] Field of Search ............................................. 360/104

[56] References Cited

U.S. PATENT DOCUMENTS

| | | | |
|---|---|---|---|
| 5,027,241 | 6/1991 | Hatch et al. | 360/105 |
| 5,065,268 | 11/1991 | Hagen | 360/104 |

*Primary Examiner*—A. J. Heinz
*Attorney, Agent, or Firm*—David B. Harrison; John C. Chen

[57] ABSTRACT

An optimized bump and offset along the spring section of a load beam of a head-gimbal assembly ("HGA") in the loaded state redistributes the mass and stiffness distributions of the load beam from a truly flat state, so that the mode shape of the first torsional resonance mode is changed such that the coupling between a drive actuator head arm and the head slider is essentially eliminated. A fabrication method to produce the desired bump and offset, and a characterization method to ascertain that optimized bump and offset parameters have been achieved are also disclosed. By optimizing bump and offset, the slider remains independent from any load beam first torsional vibration even at resonance and/or sway mode resonant frequency of the HGA may be increased.

5 Claims, 23 Drawing Sheets

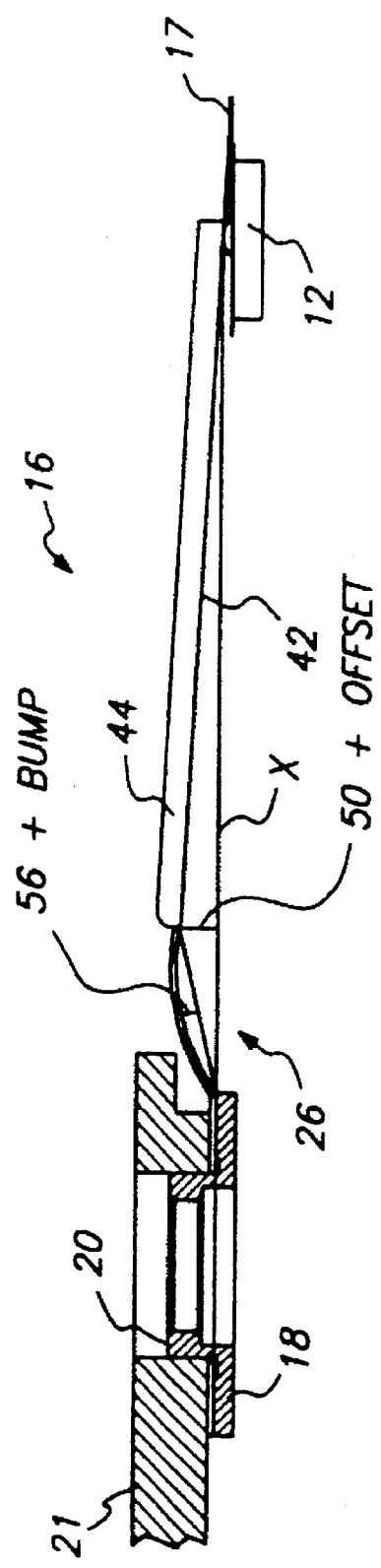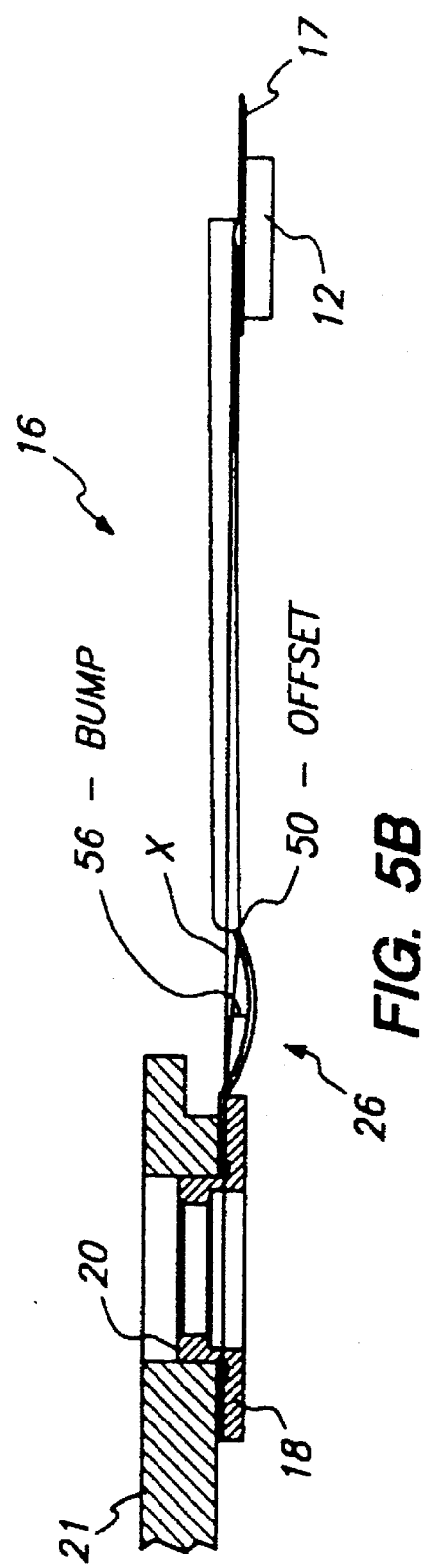
FIG. 5A
FIG. 5B (3) LOAD BEAM SPRINGS BACK (2) SPRING SECTION PLASTICALY DEFORMED (3) LOAD BEAM SPRINGS BACK (STRAIN SUPPRESSION MOMENT)

LOAD BEAM HAVING TUNED RESONANCE MODE PERFORMANCE FOR SUPPORTING A READ/WRITE HEAD

REFERENCE TO RELATED APPLICATION

This is a divisional of application Ser. No. 08/249,525 filed on May 26, 1994, now U.S. Pat. No. 5,471,734.

FIELD OF THE INVENTION

This invention relates to a head-gimbal assembly for a hard disk drive. More particularly, the present invention relates to a method for characterizing and controlling in-plane stiffness of a load beam of a head-gimbal assembly by providing optimized offset and bump parameters.

BACKGROUND OF THE INVENTION

As shown in FIG. 1, a hard disk drive 10 conventionally includes at least one rotating data storage disk 11 having its two major surfaces coated with a suitable magnetic coating (media). Frequently, but not necessarily, a plurality of disks 11 are mounted on a common rotating spindle to which rotational force is imparted by a suitable spin motor 13. Each data storage surface is provided with an associated head-slider 12 which "flies" in close proximity to the rotating data storage surface in accordance with so-called "Winchester" technology so as to write data to the surface, and to read data previously written to the surface. Each head slider is connected by a gimbal 14 to a load beam 16 which acts as a spring for applying a loading force (called "gram load") to the slider to urge it towards its associated disk surface. Each load beam is connected to a head arm 21 via a swage plate 18, which in turn is a part of an E-block 22 forming a rotary actuator. Each slider, gimbal, load beam and swage plate forms an assembly known as a "head-gimbal assembly" or "HGA".

A voice coil 24 converts electrical current into rotational force in combination with a magnetic field provided by e.g. two intense-field-providing permanent magnets 26. A read write channel 28 connects to a data transducer head formed on and carried by each slider. The read-write channel 28 is connected to disk drive electronics 30 which includes a head position servo loop 32 for controlling currents passing through the voice coil 24, and a spindle motor control 34 for controlling operation of the spin motor 14. A data path 36 leads to a host computer (not shown) with which the disk drive 10 is operatively associated. Data blocks are typically written in concentric data tracks defined on each data storage surface, and the head positioner actuator 22 moves the vertical stack of head-sliders 12 to each desired track location for writing and reading operations.

As shown in FIGS. 2A, 2B and 2C, each HGA as used in the hard disk drive 10 of FIG. 1 comprises four components: the slider 12, a gimbal 14, the load beam 16, and a swage or base plate 18; see e.g. FIGS. 2A, 2B and 2C. The load beam in the FIG. 2A example is a Hutchinson Technology type-8 suspension and a 70% slider is mounted to the load beam at the gimbal thereby to form the exemplary HGA.

The first component is the slider 12 which features a self-acting hydrodynamic air bearing and carries an electromagnetic transducer (hereafter "read/write head" or "head") which is used for recording and retrieving information from the spinning magnetic data storage disk. The head may be a thin film inductive read/write head or it may be a thin film inductive write, magnetoresistive read head structure. Other head designs, such as Metal-in-Gap (MiG) heads have also been widely used in flying head ("Winchester") magnetic recording technology.

The gimbal 14 is fixedly attached to the load beam 16 and is affixed to the slider 12 by a suitable adhesive, but is designed to be resilient in the slider's pitch and roll directions to enable the slider 12 to follow precisely the topography of the disk 11 over which it is flying. Also, the gimbal 14 is rigid in the yaw and in-plane directions for maintaining precise in-plane slider positioning.

The load beam 16 is typically formed of thin stainless steel alloy sheet material, which forms a base for attachment of the gimbal 14. The load beam 16 also defines the swage or base plate 18 which may be a sandwich construction of a thicker plate which is typically spot-welded to the load beam and which defines an annular swage flange 20 which is in turn attached by conventional ball swaging to an associated head arm 21 (see FIGS. 4A and 4B) of the actuator E-block 22. The load beam 16 further includes two sections: a resilient spring section 26 and a relatively rigid section 42 having e.g. longitudinal side flanges 44.

In the present example, the spring section 26 of the load beam 16 includes two longitudinal legs or web portions 26A and 26B. The spring section 26 is resilient in the vertical direction to permit the slider 12 to follow the topography of its adjacent data storage surface (see FIGS. 1 and 3A and 3B). The spring section 26 also supplies a downward force that counteracts the hydrodynamic lifting force developed by the slider in reaction to air pressure at the surface of the rotating data storage disk 11. In order to produce this counteracting force, the spring section 26 is plastically deformed into a curved shape so that applies a preload force to urge the gimbal 14 and slider 12 towards the disk surface. The spring preload force that counteracts the slider hydrodynamic force is commonly referred to in the art as "gram load".

The flanged section 42 is conventionally characterized by two vertical lip or flange portions 44 bent directly from the main body of the load beam providing additional, bending and stiffness to the load beam 16. The flange design could include up-facing vertical lip portions 44A, as shown in FIG. 3A for example, or the flange section design could employ down-facing vertical lip portions 44B as shown in FIG. 3B (this arrangement is usually known as an inverted-flange load beam design). One exemplary inverted-flange load beam design is disclosed and characterized in commonly assigned U.S. Pat. No. 5,027,241 to Hatch et al, entitled: "Data Head Load Beam for Height Compacted, Low Power Fixed Head and Disk Assembly", the disclosure thereof being incorporated herein by reference.

The fourth component is the base plate or swage plate 18 which attaches the load beam 16 to the support arm 21 of the actuator E-block 22. The base plate 18, also typically formed of stainless steel alloy, is often formed to have a greater thickness than the load beam so as to provide necessary stiffness for structural strength reason and to accommodate other features for fastening, such as the swaging flange or boss 20 which facilitates swaging to the head arm 21 of the actuator E-block, as shown in FIGS. 4A and 4C, for example.

An ideal head suspension design is one in which the slider faithfully and precisely follows the support arm motion within the frequency range of interest. That is, the E-block support arm motion generated by the actuator voice coil should be transmitted through the load beam and gimbal to the slider without any amplification, reduction, delay or lead, or any other distortion. When these conditions are obtained, the head tracking effort can be performed predictably and efficiently; and, track densities can thereby be increased and access times reduced. However, this result is difficult to achieve because any mechanical system that possesses mass and stiffness has resonant frequencies at which the input motion will be amplified substantially. FIG. 6 shows how the amplification varies with frequency of a prior art suspension design with up-facing flange (which in this example is a type-8 suspension manufactured by Hutchinson Technology, Incorporated, herein "type-8 HGA") from the support arm to slider. As shown in FIG. 6 for a type-8 HGA, the suspension support motion is amplified substantially at three separate resonant frequencies: the 1st torsional mode resonance (at approximately 2200 Hz), the sway mode resonance (at approximately 6000 Hz), and 2nd torsional mode resonance (at approximately 8500 Hz).

FIGS. 7A, 7B and 7C illustrate conventional finite element analysis models of the type-8 HGA. In this model of the suspension, three families of dynamic: modes are illustrated: namely, bending modes (FIG. 7A), torsional modes (FIG. 7B) and sway modes (FIG. 7C). Bending modes, when excited, cause the slider to move up and down relative to the magnetic disk, contributing slightly to a second order effect on the ability of the data head to follow the data track, if there is any discernible effect at all.

However, the torsional and sway modes, when excited by the support arm, produce directly transverse motion of the slider relative to the data track, causing head/track misregistration and, if large enough, result in servo system stability problems. While a major effort has been made within the hard disk drive industry to reduce the undesired amplification at those resonant frequencies, this effort has not been entirely successful in the past, and it has been characterized by considerable experimentation and "trial and error" techniques.

Because of the presence of the load beam flanges in the reinforced section, the shear center of the load beam is often separated from the center of gravity along the length of load beam. A pure in-plane support arm motion cart thus induce the torsional motion of the HGA even when the load beam is truly flat. Two undesirable effects result from this coupling. First, the in-plane support arm motion can excite the torsional resonance of the HGA system. This can make the head tracking system unstable if the amplification is too large, as often occurs in the hard disk drive industry. Second, the coupling of torsional stiffness with in-plane stiffness decreases the resonant frequency of the sway mode. Servo system stability problems can also arise if the sway mode amplitude and frequency are not controlled.

Heretofore, the HGA was formed to have a desired preload characteristic by forming the spring region thereof by bending it to follow a contour of a forming die. While the prior art forming dies followed e.g. a circular contour, they most frequently caused the load beam to manifest a s positive bump and offset when the HGA assumed its loaded (flying) position relative to the adjacent data storage disk surface. Attempts were made iteratively, and experimentally, to improve in-plane stiffness characteristics of the prior art HGA, but those attempts were of the "cut and try" variety, and very little scientific analysis was applied to understanding the factors and parameters affecting in-plane stiffness.

Conventional wisdom within the disk drive load beam art has suggested that ideal operation of the HGA in the loaded state (i.e. when the rotating disk is up to speed and the slider is flying over the disk) is realized when the load beam spring section 26 is perfectly flat, so that it is intuitively expected to manifest the greatest in-plane stiffness and rigidity. One example of this conventional wisdom is found in U.S. Pat. No. 5,065,268 to Hagen, entitled: "Load Beam Having An Additional Bend In A Head-Gimbal Assembly", the disclosure thereof being incorporated herein by reference. This prior approach featured plural transverse plastic bends defined along the spring section of the load beam in the unloaded state. When the load beam was deformed to its loaded state it was said to achieve a reasonably flat load beam to promote in-plane stiffness. If one integrates a longitudinal cross section of the spring section of that load beam, the result is approximately a "zero bump" contour. The drawbacks of this prior approach were that sharp transverse bends or creases were required during formation, leading to complex mandrel designs and fabrication procedures, and the resultant design only approximately achieved its desired goal of true maximum in-plane stiffness.

Thus, a hitherto unsolved need has remained for a load beam in the head-gimbal assembly having an optimized offset and an optimized bump to maximize loaded in-plane stiffness, and methods for making and testing the resultant load beam to achieve maximum loaded in-plane stiffness.

SUMMARY OF THE INVENTION WITH OBJECTS

A general object of the present invention is to provide a load beam structure which eliminates torsional coupling between the load beam support arm and the read/write head, to maximize the resonant frequency of the sway mode of the head slider suspension assembly, and to achieve both results alternatively or simultaneously in a manner overcoming limitations and drawbacks of the prior art, thereby to improve tracking stability of the read/write head structure relative to the data tracks on the rotating data storage disk.

Another general object of the present invention is to provide methods for scientific, precise solution of problems with the dynamics of HGA torsional modes and sway modes by establishing an optimized bump and an optimized offset that can either dynamically decouple the slider from the torsional motion of the rest of the HGA or maximize the resonant frequency of the sway mode, or both, in a manner overcoming limitations and drawbacks of the prior art.

Another object of the present invention is to provide a method for making a load beam having a spring section formed with a controlled bump and offset contour in order to maximize loaded in-plane stiffness of the load beam, thereby overcoming limitations and drawbacks of the prior art.

A further object of the present invention is to provide a method for characterizing in-plane stiffness of an HGA to ascertain whether it is has achieved maximized stability at a selected resonant frequency after loading its slider into flying position proximate to a rotating data storage surface.

One more object of the present invention is to realize an improved disk drive having greater track densities and reduced access times because of increased in-plane stiffness of a load beam for transferring actuator motion to the head slider without distortion.

Yet another object of the present invention is to provide a repeatable manufacturing process for realizing HGAs manifesting greater in-plane stiffness when operating within hard disk drives, thereby increasing disk drive performance and lowering overall disk drive costs through higher manufacturing yields.

A still further object of the present invention is to provide a load beam with a desired bump and offset characteristic in the loaded stated in order to maximize in-plane stiffness at a desired HGA resonance frequency.

Yet one more object of the present invention is to characterize a known HGA design in a manner yielding desired bump and offset characteristics in loaded state, and thereafter precisely determine a forming contour for a forming die by which the desired bump and offset characteristics are replicated in the HGA in a manufacturing process.

The present invention features an optimized bump and offset along the spring section of the load beam of an HGA in the loaded state and provides a fabrication method to produce the desired bump and offset, and a characterization method to ascertain that optimized bump and offset parameters have been achieved. The bump and offset can redistribute the mass and stiffness distributions of the load beam from a truly flat state.

If the magnitude and direction of bump and offset are correctly incorporated into the load beam structure, one or both of the following two effects can result. First, the mode shape of the 1 st torsional mode is changed such that the coupling between the suspension support arm and the slider is essentially eliminated. As a result, lateral motion of the slider remains independent from any load beam first torsional vibration even at resonance. Second, the torsional stiffness of the load beam is fully decoupled from the in-plane stiffness. With the new structural configuration and fabrication method, a truly maximum in-plane stiffness and therefore the maximum resonant frequency of the sway mode become achievable.

In one aspect the present invention provides a method for forming an unformed load beam to have essentially zero torsional gain or maximized resonant frequency of the sway mode within a disk drive HGA when loaded in proximity with a data storage disk wherein the load beam includes a connection potion (swage plate potion) affixed to a head arm, a spring portion extending from the connection portion, a reinforced portion extending from the spring portion and a slider-gimbal portion (including a slider dimple) extending from the reinforced potion for gimbal-mounting a head-slider. Within this environment the method comprises the steps of:

a. characterizing the head-gimbal assembly with any suitable analytical tool, such as finite element analysis for example, to determine torsional mode resonance and sway mode resonance thereof, b. determining optimal bump and offset parameters for the load beam characterized in step a, c. determining the magnitude of the plastic curvature along the spring portion side profile in the unloaded state from the determination of step b, d. determining the amount of total curvature along the spring potion side profile from the plastic curvature determination of step c, e. determining the profile of a forming die according to the amount of total curvature determined in step d, f. contouring a forming die means in accordance with the profile determined in step e, and g. forming an unformed load beam to a contour providing desired bump and offset parameters in the loaded state by forcing a spring portion thereof to conform to the contour of the forming die formed in step f.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIGS. 2A, 2B and 2C respectively comprise a top plan view of the head-gimbal assembly; a side view in elevation of the head-gimbal assembly in a loaded state; and, a side view in elevation of the head-gimbal assembly in an unloaded state.

FIG. 5A is an enlarged, somewhat diagrammatic side view in elevation of an HGA characterized as having a positive bump as most frequently encountered in the prior art. FIG. 5B is an enlarged, somewhat diagrammatic side view in elevation of an HGA characterized as having a negative bump and offset in accordance with principles of the present invention.

DETAILED DESCRIPTION OF A PREFERRED EMBODIMENT

The present invention deals with the dynamics involved with the torsional modes and the sway modes. The present invention represents the discovery that adjustment and control of bump and offset parameters of a spring section of an HGA can either dynamically decouple the slider from the torsional motion of the rest of the HGA or maximize the resonant frequency of the sway mode, or both. The invention further provides a systematic method for achieving optimization of bump and offset parameters, and for making forming dies and forming load beam spring sections thereon, once torsional and/or sway resonance characteristics of the HGA have been determined.

Figure 1:
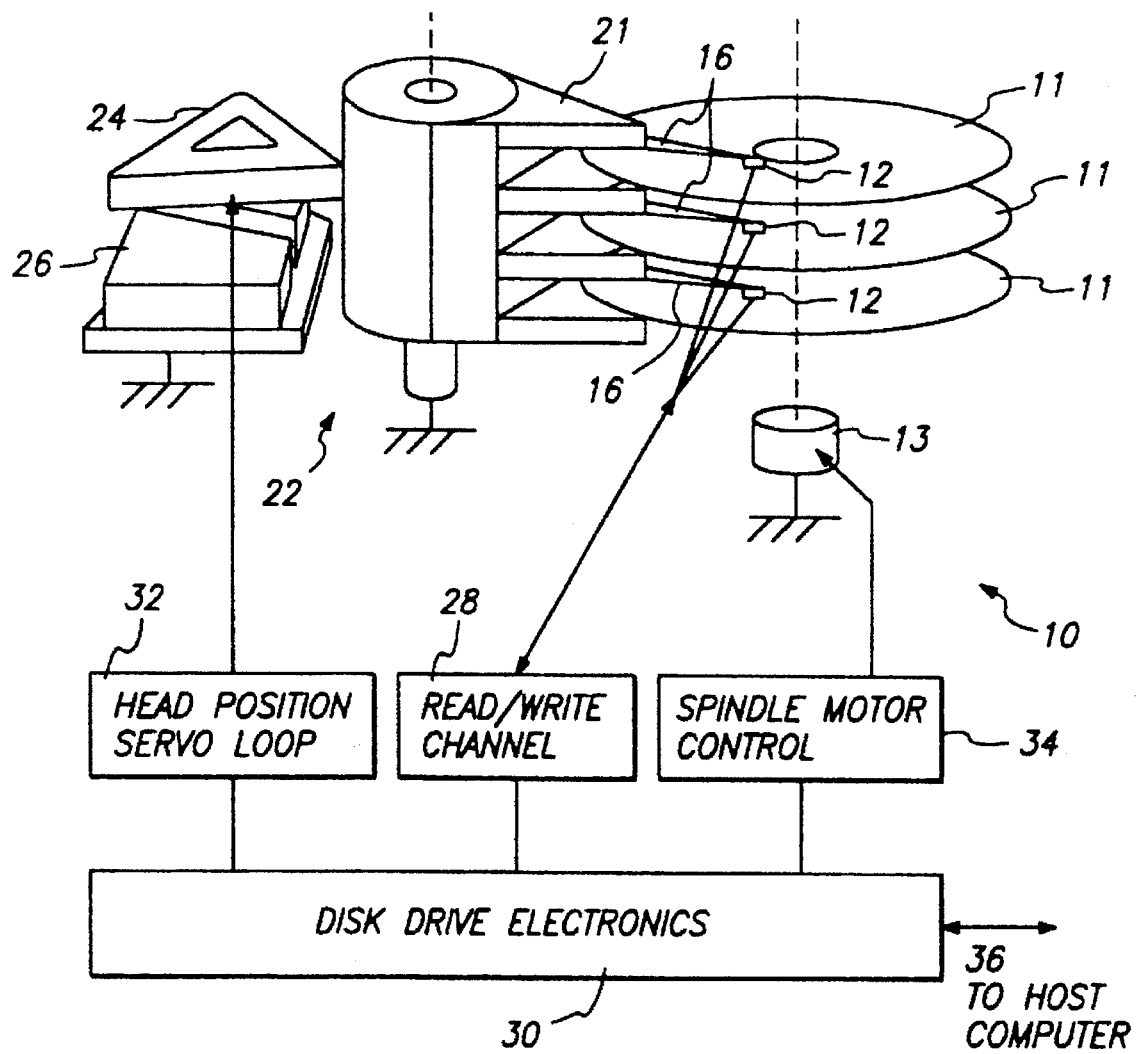
FIG. 1 is a block and functional diagram of a hard disk drive including conventional features and having HGAs in accordance with principles of the present invention.
Figure 2A:
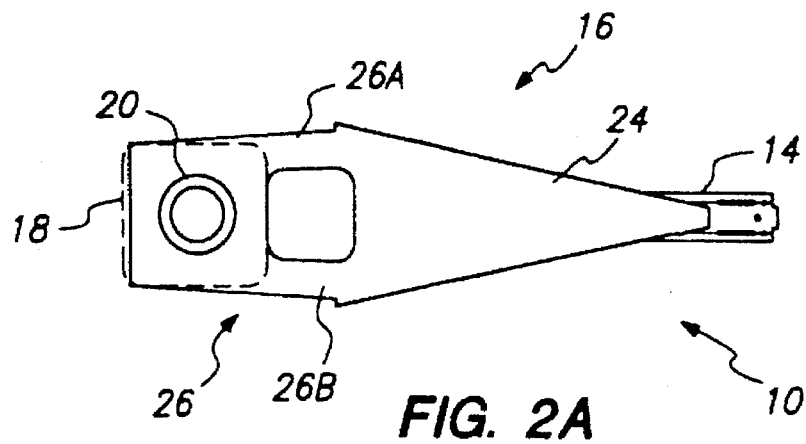
FIGS. 2A, 2B and 2C illustrate a conventional type-8 head suspension with 70% slider (hereinafter "type-8 HGA") for characterization for optimum in-plane stiffness in accordance with the present invention.
Figure 2B:
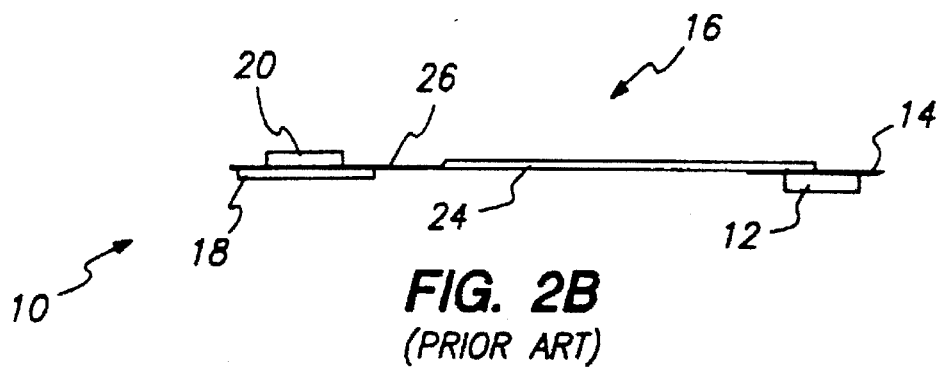
Figure 2C:
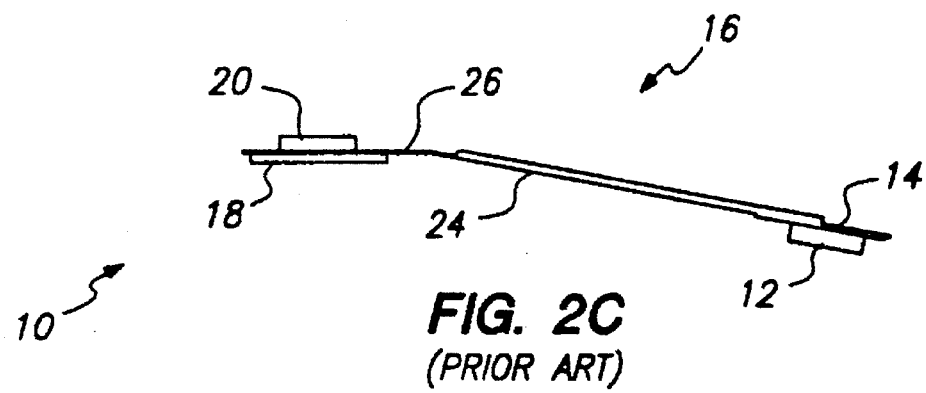
Figure 3A:
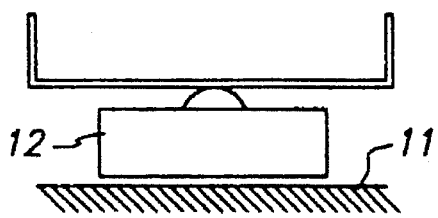
FIGS. 3A and 3B respectively illustrate a conventional HGA having upwardly facing side reinforcement flanges; and, a conventional HGA having downwardly facing side reinforcement flanges.
Figure 3B:
Figure 4A:
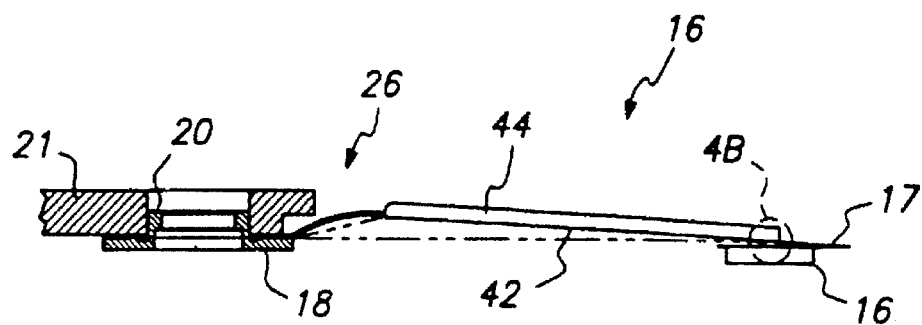
FIG. 4A comprises a somewhat diagrammatic side view in elevation of an exemplary HGA for characterization and formation in accordance with principles of the present invention.
Figure 4B:
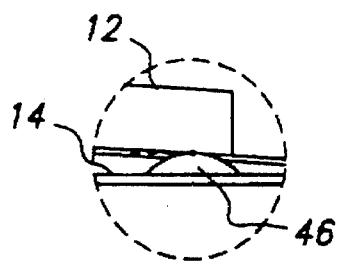
FIG. 4B comprises an enlargement of a load dimple feature of a gimbal of the FIG. 4A HGA.

In order to understand and appreciate the nuances of the present invention and its contribution to the art, some definitions are in order. In FIG. 4A, a plane of rotation of the rotary actuator structure 22 including head arm 21 is designated by a dashed horizontal line x. This plane of rotation is seen to pass through an intersection between the slider 12 and a load dimple 46. This plane (along axis x) is used to establish a base leg of an acute right triangle shown in double-dashed lines in the enlarged view of FIG. 4C. The right triangle shown in FIG. 4C includes a height leg or dimension denoted with the reference numeral 50 which serves to denote the magnitude of the "offset" parameter. In this example, the height dimension 50 establishes the magnitude of a "positive offset" since, this dimension marks a distance of the load beam at a junction (denoted by a reference numeral 52) of the spring region 26 and the reinforced region 42 away from the base axis x and away from the adjacent data storage surface. If the spring-reinforcement junction 52 was located below the axis x, and therefore, the load beam 16 was closer to the adjacent data storage surface than the base axis x, the offset magnitude would be a "negative offset".

Figure 4C:
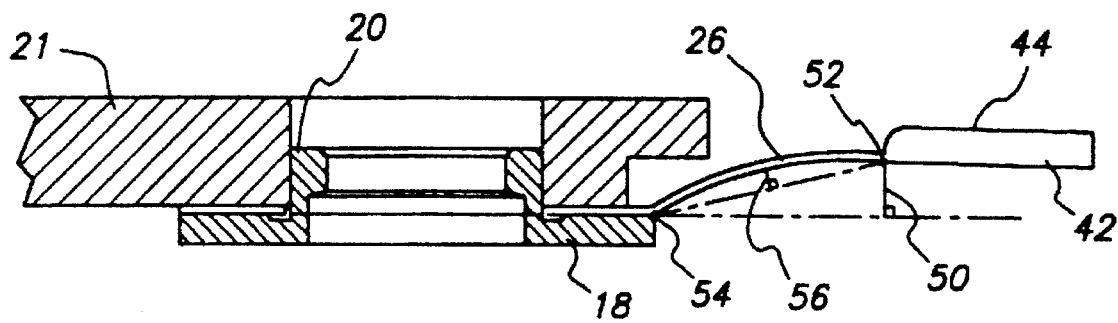
FIG. 4C comprises an enlargement of the spring region of a load beam of the FIG. 4A HGA and illustrates the bump and offset parameters employed to characterize performance of the HGA.
Figure 6:
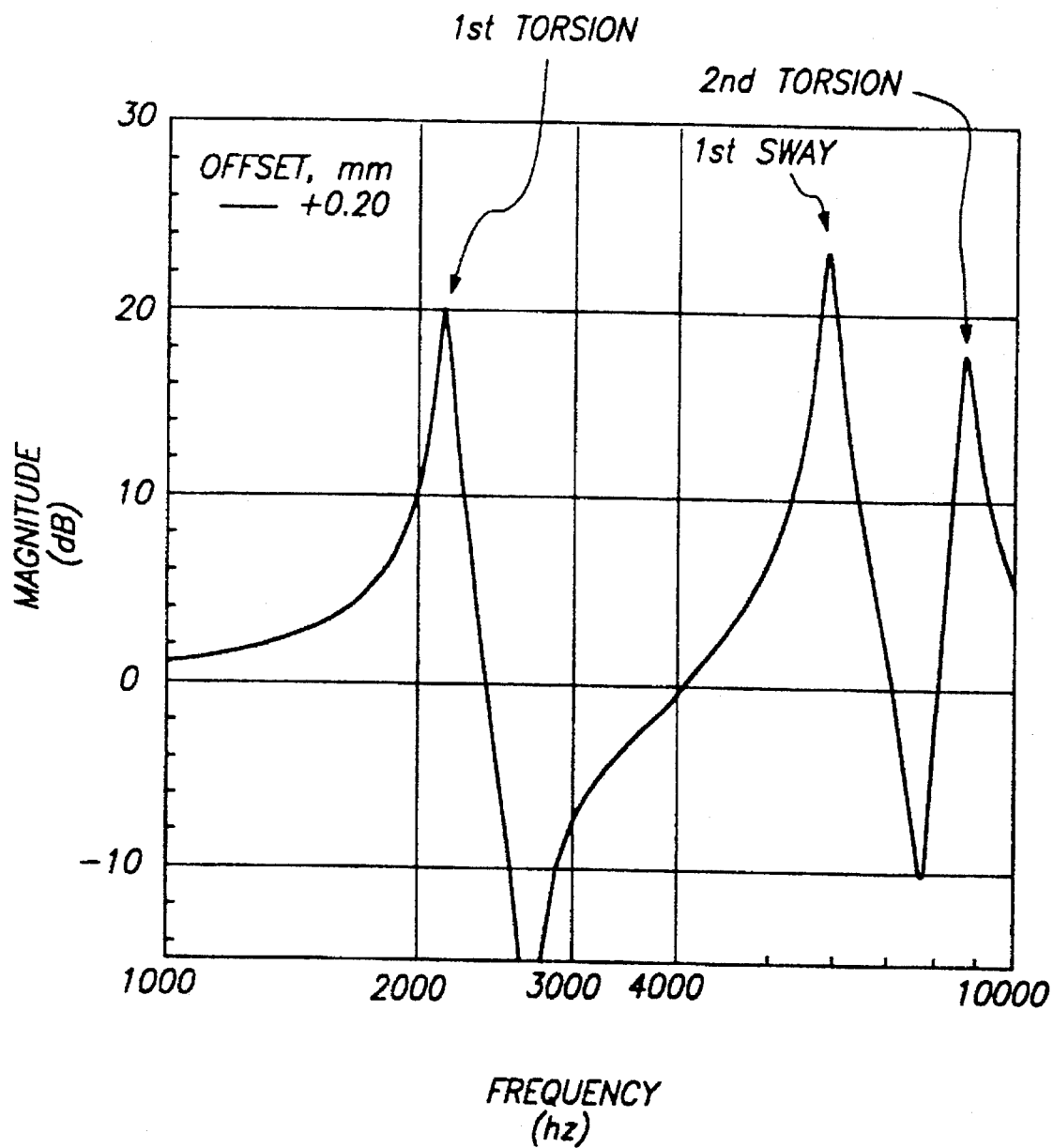
FIG. 6 is a graph of a typical amplification curve versus frequency for a type-8 HGA and without any damper structure.
Figure 15:
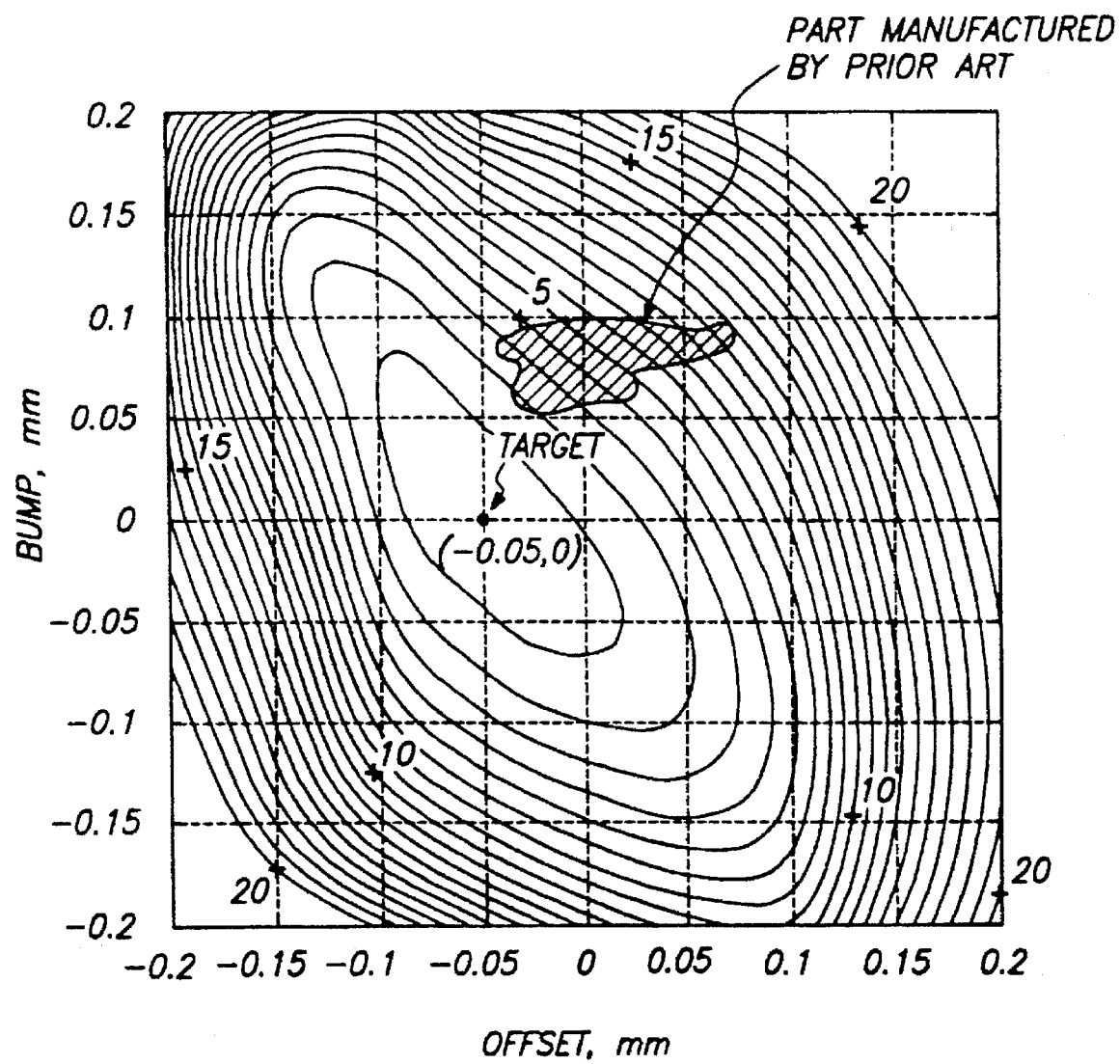
FIG. 15 is a contour plot of 1st torsional mode resonance amplitude versus offset and bump for a type-8 HGA, with 1 dB contours showing an ideal target design in accordance with principles of the present invention and also showing the contours of prior art design characteristics in shaded view.

Also, as shown in the enlarged view of FIG. 4C, the spring region 26 in this example is defined as an arc extending from the spring-reinforcement junction 52 to a spring-swage plate junction (designated by the reference numeral 54). A chord is drawn between junction 52 and junction 54. The chord is actually the hypotenuse of the right triangle having its base congruent with the x-axis and the height 50. The chord extends from the junction 54 to the junction 52, and at a location equidistant from the ends of the chord, a perpendicular line is drawn to the arc. This line, denoted by reference numeral 56, serves to denote the magnitude of the "bump" parameter. In this example, the line 56 extends away from the x-axis (and the adjacent disk surface), and so the bump is said to have a positive magnitude and therefore be a "positive bump". If the line 56 extended toward the x-axis given a positive offset, or toward the disk surface given a negative offset, the bump would be a "negative bump". As indicated by the contour plot shown as FIG. 15, the prior art HGAs employing type-8 load beams and 70% sliders (shown in the hatched region) may manifest either a positive ,or negative offset magnitude, but they routinely are characterized by having a positive bump magnitude. In accordance with principles of the present invention, for optimal performance, a type-8 suspension with a 70% slider should have an offset of −0.05 mm and a bump of zero ram. It would also work well with an offset of zero and a bump of −0.05, and it would still work well with an offset of −0.075 and a bump of +0.05, as shown by the area of the FIG. 15 plot embraced by the central contour line surrounding the target value.

In FIG. 5A, the spring section 26 of the load beam 16 has been formed to present a positive bump 56 as well as a positive offset 50. This configuration is one most characteristic of the prior art approaches, and often leads to suboptimal HGA performance. On the other hand, in FIG. 5B the spring section 26 has been formed to present a negative bump 56 and a negative offset 50 and is in accordance with an important aspect of the present invention.

Figure 8A:
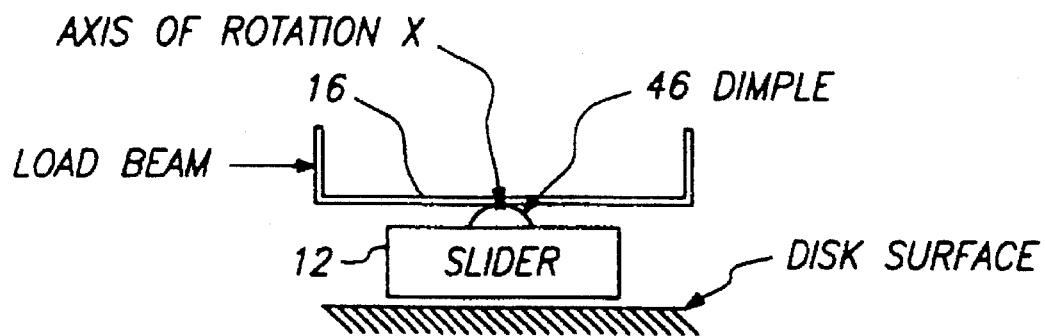
FIGS. 8A and 8B are enlarged diagrammatic views of a type-8 HGA illustrating respectively a front end view and a side view showing passage of a torque axis of rotation as passing through the load beam/dimple contact point.
Figure 8B:
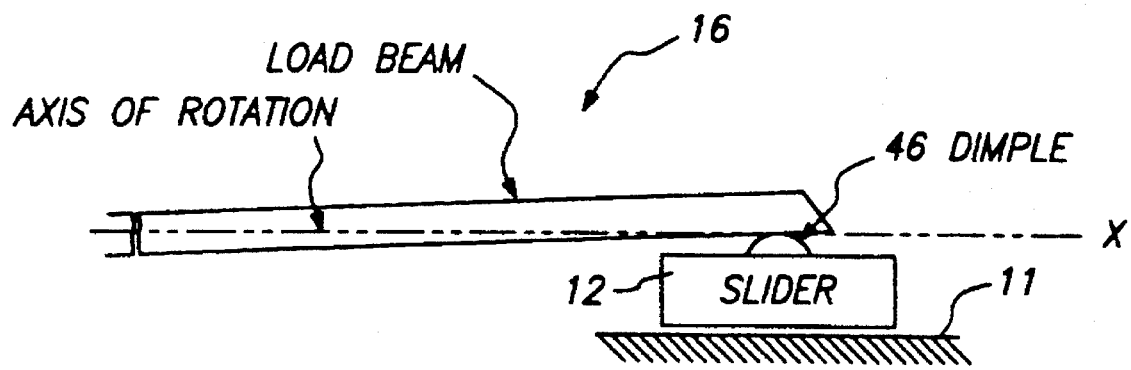

Torsional mode is a rotational motion in nature. A main operative principle of the present invention is to shape the bump and offset contours of the spring section 26 such that the axis of rotation x of the torsional mode precisely passes through a point of contact between the load dimple 46 of the gimbal 14 and the load beam 16, as shown in FIG. 8.

When the axis of rotation x is so located, the slider 12 remains almost motionless even when the rest of the HGA including the gimbal 14 and load beam 16 is resonated violently at the resonant frequency of the 1 st torsional mode. Alternatively, the bump and offset contour can be established so that the torsional stiffness of the load beam 16 is decoupled from the in-plane stiffness thereof. In this manner, the resonant frequency of the sway mode resonance can be made very high.

Figure 9:
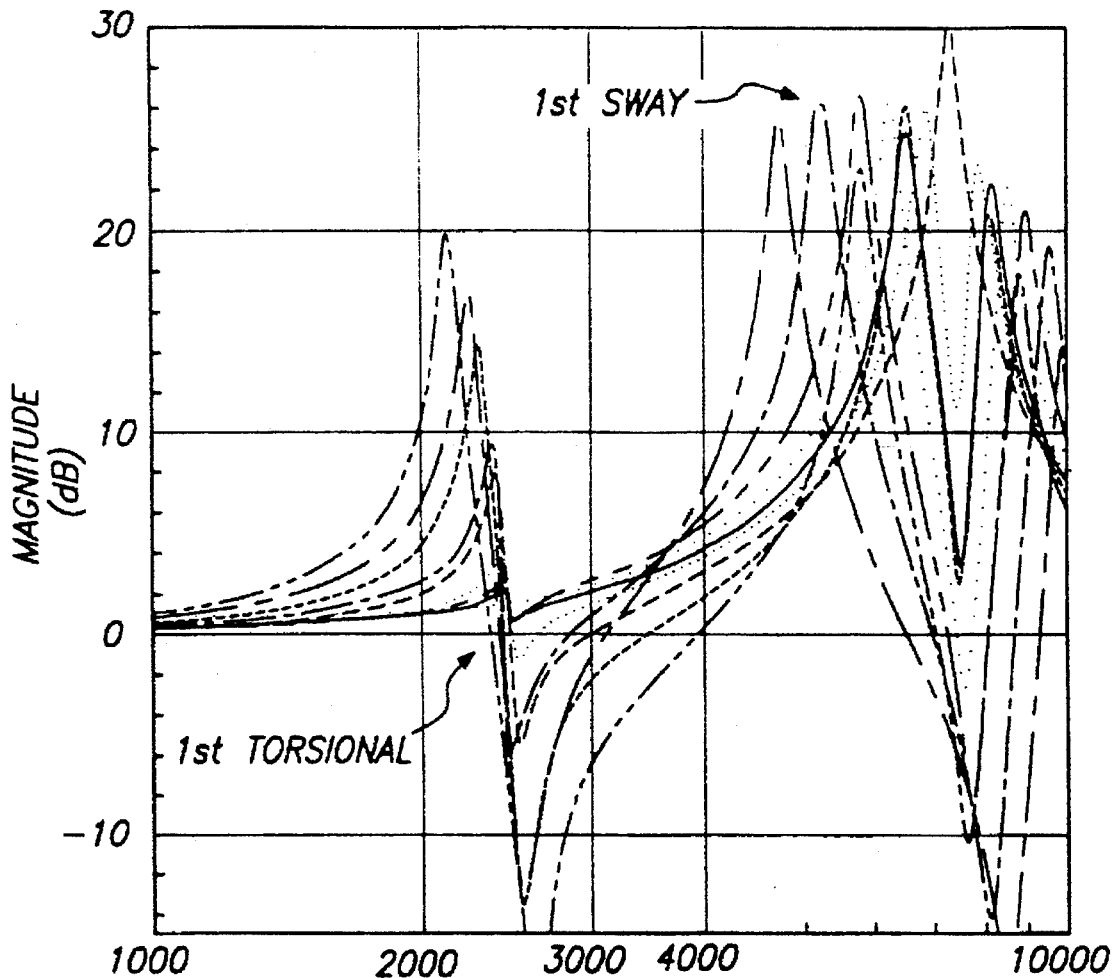
FIG. 9 comprises a family of graphs of typical amplification curves for the type-8 suspension with bump held equal to zero and offset varied in nine steps from −0.20. mm to +0.20 mm, illustrating reduction of first torsional mode resonance amplitude as offset is adjusted toward −0.03 min.
Figure 10:
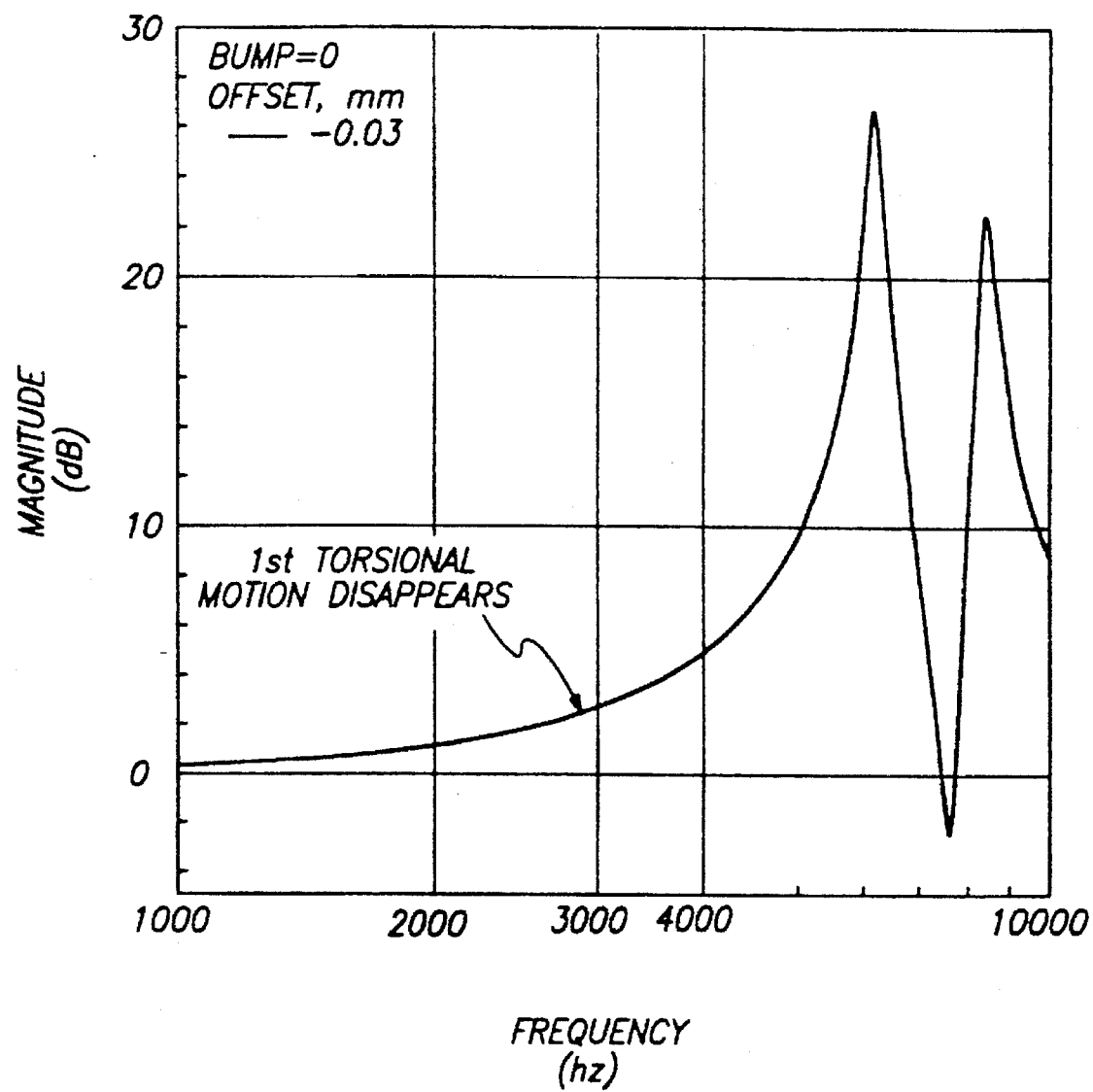
FIG. 10 is a graph of the −0.03 mm offset amplification curve extracted from the family of graphs of FIG. 9, showing effective elimination of the first torsional resonance mode amplitude by providing a slightly negative offset, in accordance with principles of the present invention.
Figure 11:
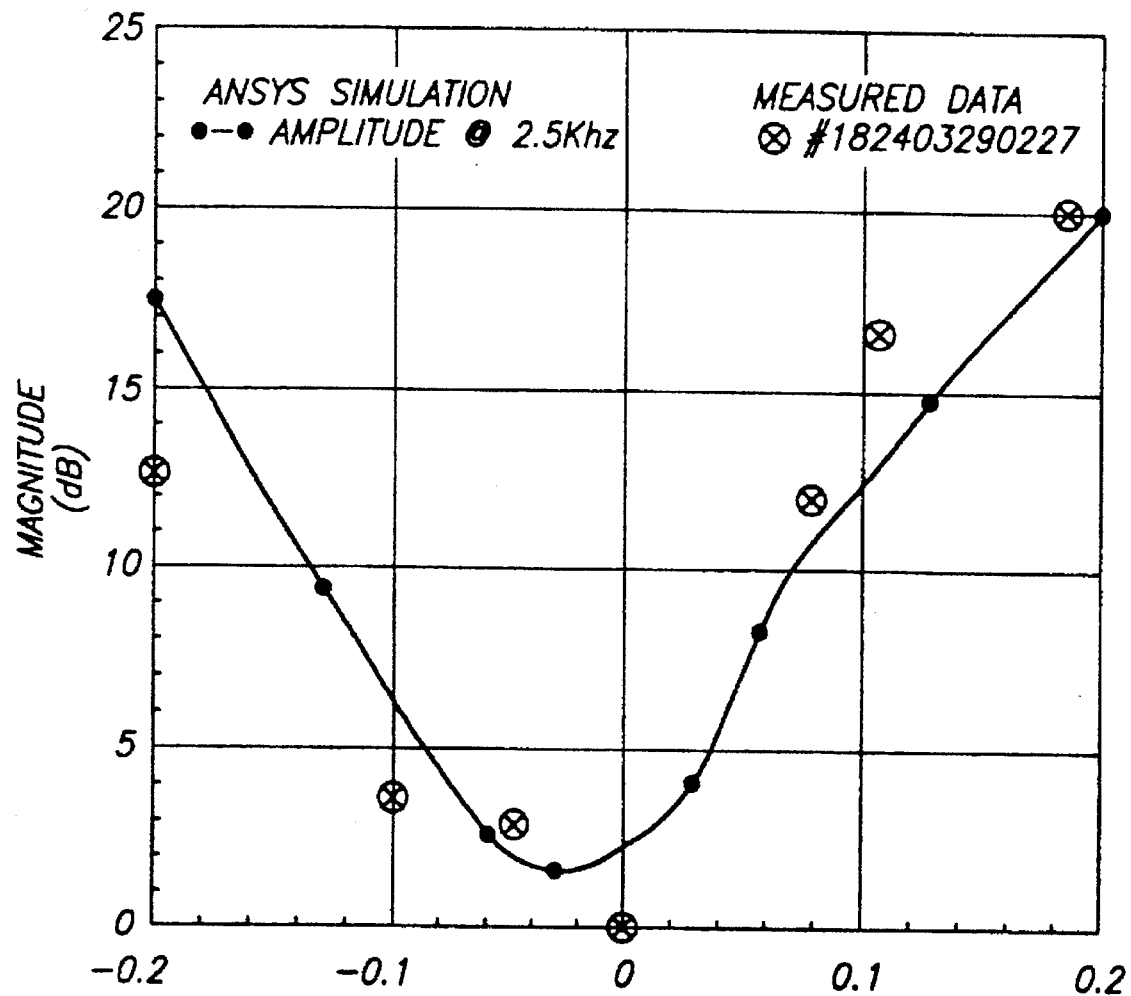
FIG. 11 is a graph illustrating a close agreement between theoretical calculations and actual test data collected for a type-8 suspension for plus and minus offset magnitude variations at 2.5 kHz in accordance with principles of the present invention.

In accordance with principles of the present invention, FIG. 9 demonstrates the effect of varying offset with constant bump on the amplification within the type-8 HGA of excitation motion imparted by the head arm 21, as measured at the slider 12 position. The amplification at the resonant frequency of 1st torsional mode (approximately 2.2 kHz) is seen to be significant with substantial negative offset (−0.20 mm) and positive offset (+0.20 mm), and surprisingly reaches a minimum value at a slightly negative offset, e.g. −0.03 mm. FIG. 10 extracts the amplification curve corresponding to a slightly negative offset parameter of −0.03 mm. The torsional motion of the slider 12 of the type-8 HGA totally disappears in the FIG. 10 curve, leaving only a high frequency sway mode amplification component. FIG. 11 demonstrates an excellent agreement between the theoretical prediction and measured test data at an excitation frequency of 2.5 kHz between amplitude of torsional amplification and offset variation.

Figure 12:
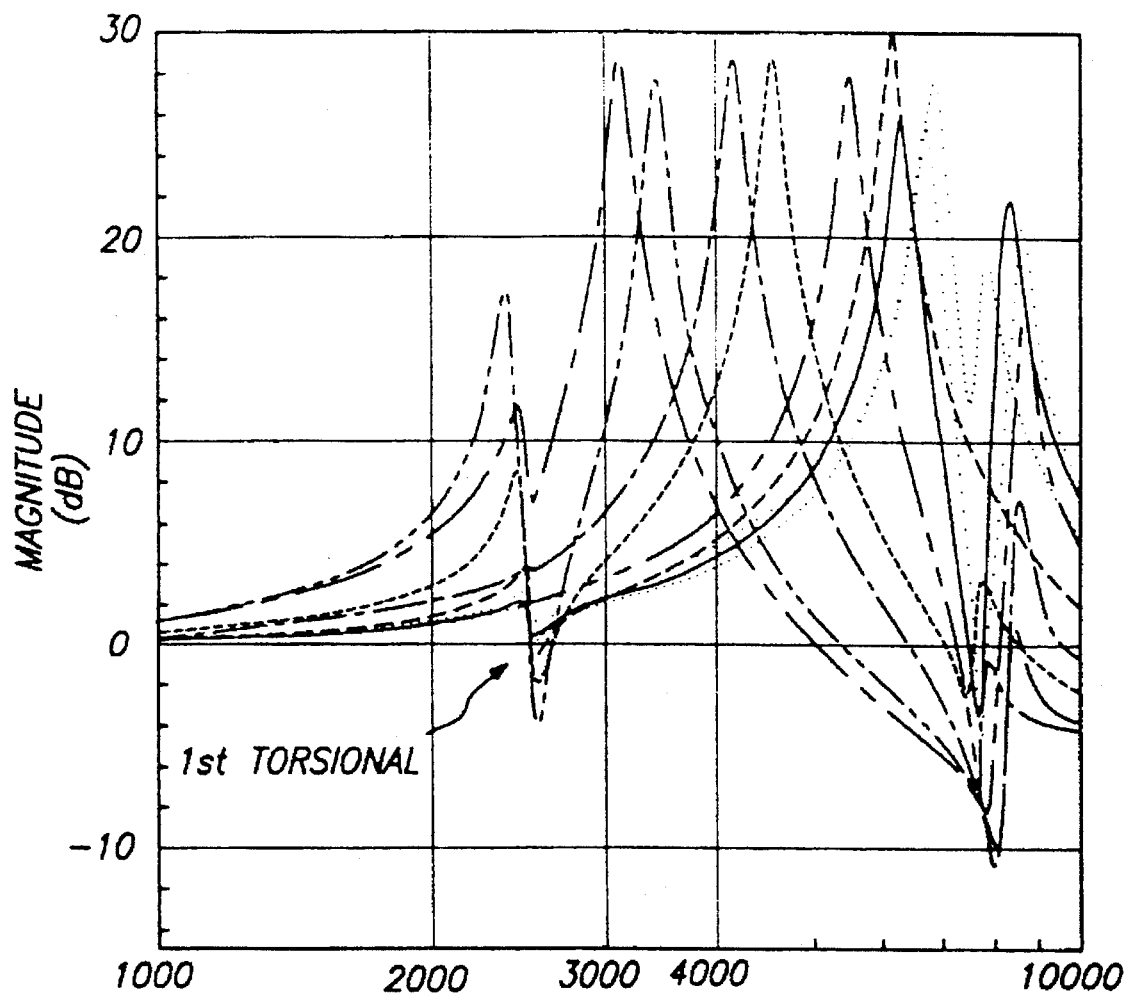
FIG. 12 comprises a family of graphs of typical amplification curves for the type-8 HGA with offset held equal to zero and bump varied in nine steps from −0.20 mm to +0.20 mm, illustrating reduction of first torsional mode resonance amplitude as bump is adjusted toward the −0.06 mm bump.
Figure 13:
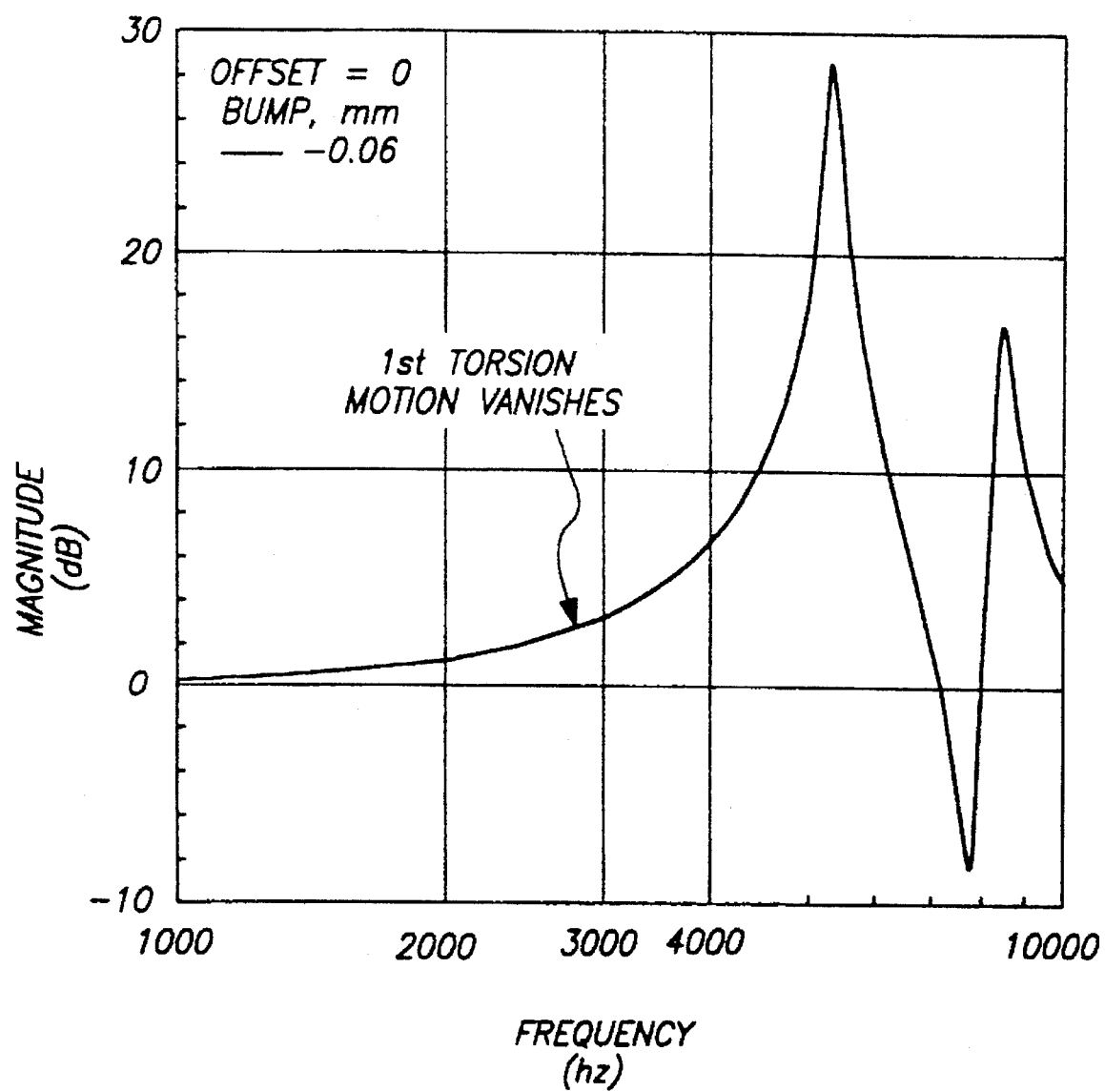
FIG. 13 is a graph of the −0.06 mm bump amplification curve extracted from the FIG. 12 family of graphs, showing effective elimination of the first torsional resonance motion of the slider.
Figure 14:
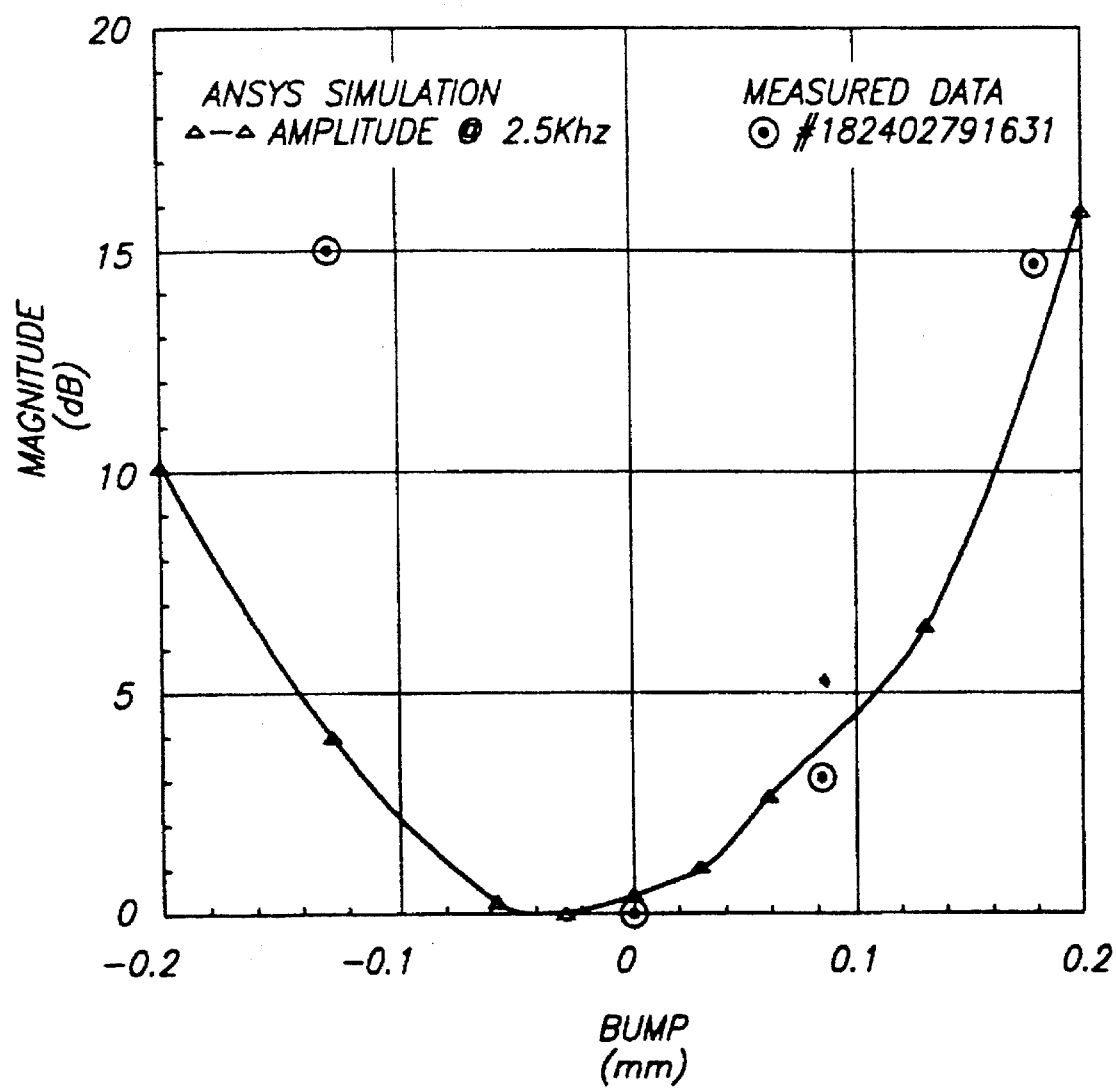
FIG. 14 is a graph illustrating a close agreement between theoretical calculations and actual test data collected for a type-8 suspension for plus and minus bump magnitude variations at 2.5 kHz in accordance with principles of the present invention.

FIG. 12 illustrates the effect of variations in the bump parameter with the offset parameter held constant on the amplification of head arm motion as measured at the slider position. The amplification at the resonant frequency of 1st torsional mode (again approximately 2.2 kHz) is seen to be significant with substantial negative bump (−0.20 mm) and positive bump (+0.20 mm), and surprisingly reaches a minimum value at a slightly negative bump of e.g. −0.06 mm. FIG. 13 extracts the amplification curve of bump=0.06 mm. The torsional motion of the slider 12 of the type-8 HGA totally disappears in the FIG. 13 curve, leaving only a high frequency sway mode as a dominant resonance amplification. FIG. 14 demonstrates an excellent agreement between the theoretical prediction and measured test data at an excitation frequency of 2.5 kHz between amplitude of torsional amplification and bump variation.

FIG. 15 is a matrix plot which shows amplification at the frequency of 1st torsional mode versus plus and minus bump and plus and minus offset simultaneously for a type-8 HGA. At an offset of −0.05 mm and a bump of 0.00 mm, the effect of bump and offset reinforce each other leaving a design at this place most stable and most immune to fabrication tolerance on bump and offset. The shaded zone in the plot represents the distribution of bump and offset of the type-8 suspensions shipped by all Quantum venders. A big reduction of torsional amplification can be achieved if the bump and offset can be shifted to the targeted zone centered at offset=−0.05 mm and bump=0.00 mm.

Figure 16:
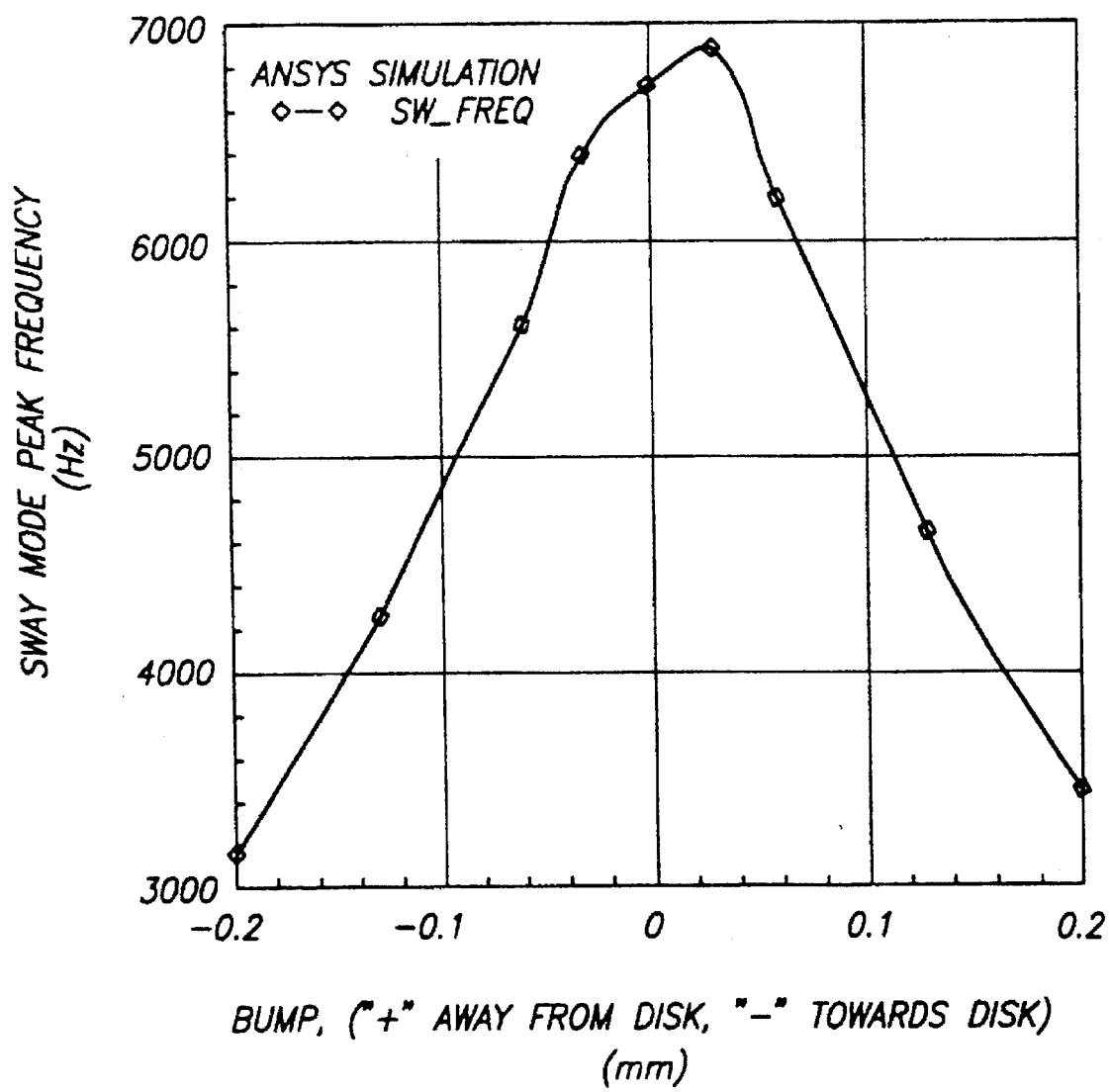
FIG. 16 is a graph illustrating the resonant frequency of sway mode as a function of plus and minus bump for a type-8 HGA in accordance with principles of the present invention.
Figure 17:
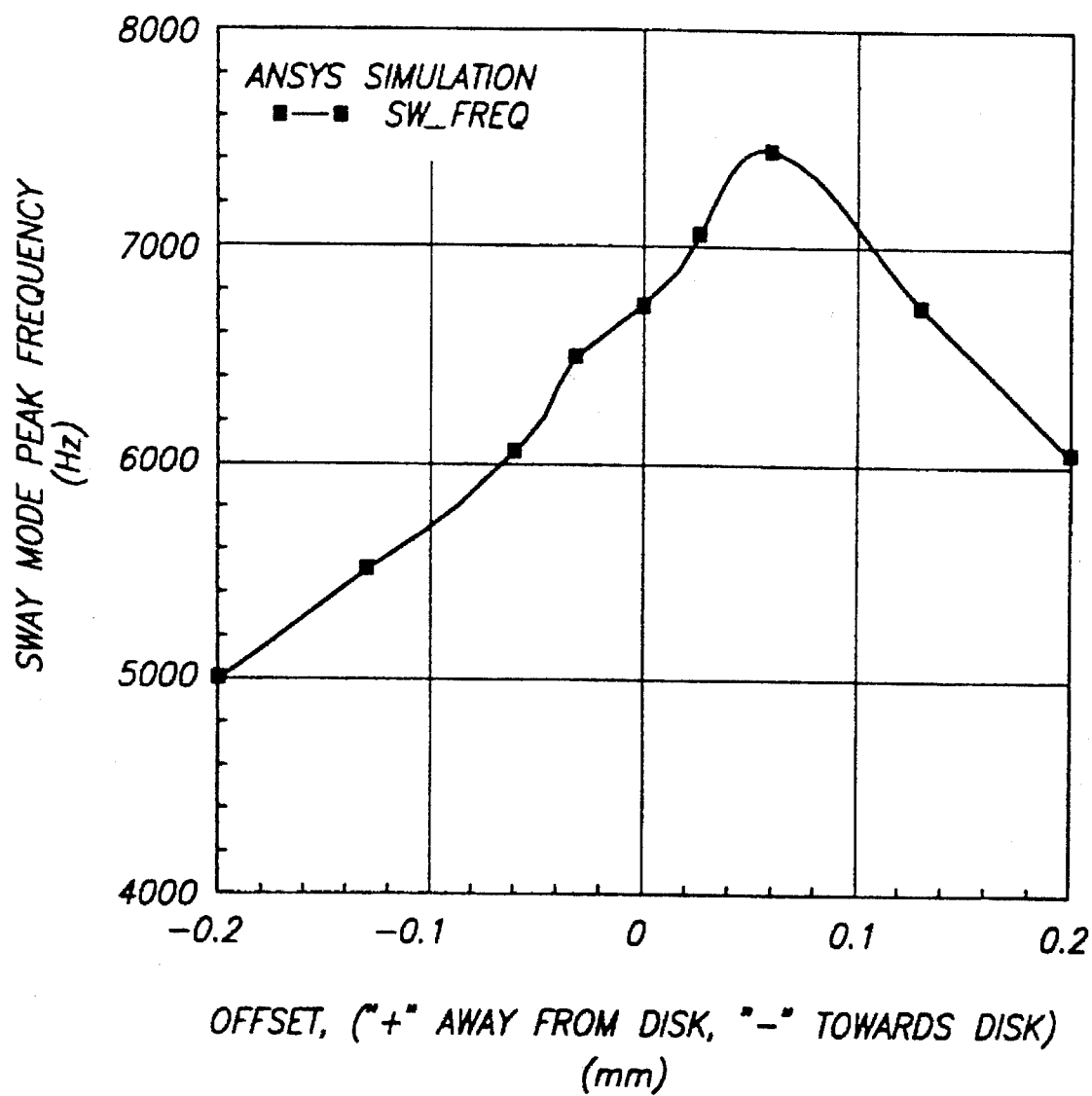
FIG. 17 is a graph illustrating the resonant frequency of sway mode as a function of plus and minus offset for a type-8 HGA in accordance with principles of the present invention.

Also, the families of curves of FIGS. 9 and 12 show that the resonance frequency of the HGA sway mode changes substantially as the bump and offset parameters are changed. FIGS. 16 and 17 single out this effect with respect to bump and offset respectively in a type-8 HGA. It can be seen that the resonant frequency of the sway mode reaches a maximum at bump of +0.04 mm in FIG. 16, and at an offset of +0.06 mm in FIG. 17. This effect results from redistribution of the mass and stiffness of the HGA load beam 16 from this particular bump and offset combination such that the in-plane stiffness and torsional stiffness of the load beam 16 are fully decoupled from each other. The sway mode is mainly an in-plane motion in nature. Since the torsional stiffness is smaller than the in-plane stiffness, when coupled to the in-plane stiffness, the torsional stiffness tends to reduce the resonant frequency of the sway mode. That is why the resonant frequency of sway mode reaches its maximum when the torsional stiffness is fully decoupled.

Moving the resonant frequency of sway mode higher makes the head tracking servo control system 32 more stable. This is a second benefit resulting from control of the bump and offset parameters of an HGA load beam. However, for a type-8 HGA, the elimination of slider torsional coupling and maximization of sway mode resonant frequency can not be achieved simultaneously. Accordingly, the HGA designer has to decide which effect will be optimized according to the servo control system requirement or adjust bump and offset so that both effects are optimized in a compromise sense.

Figure 18:
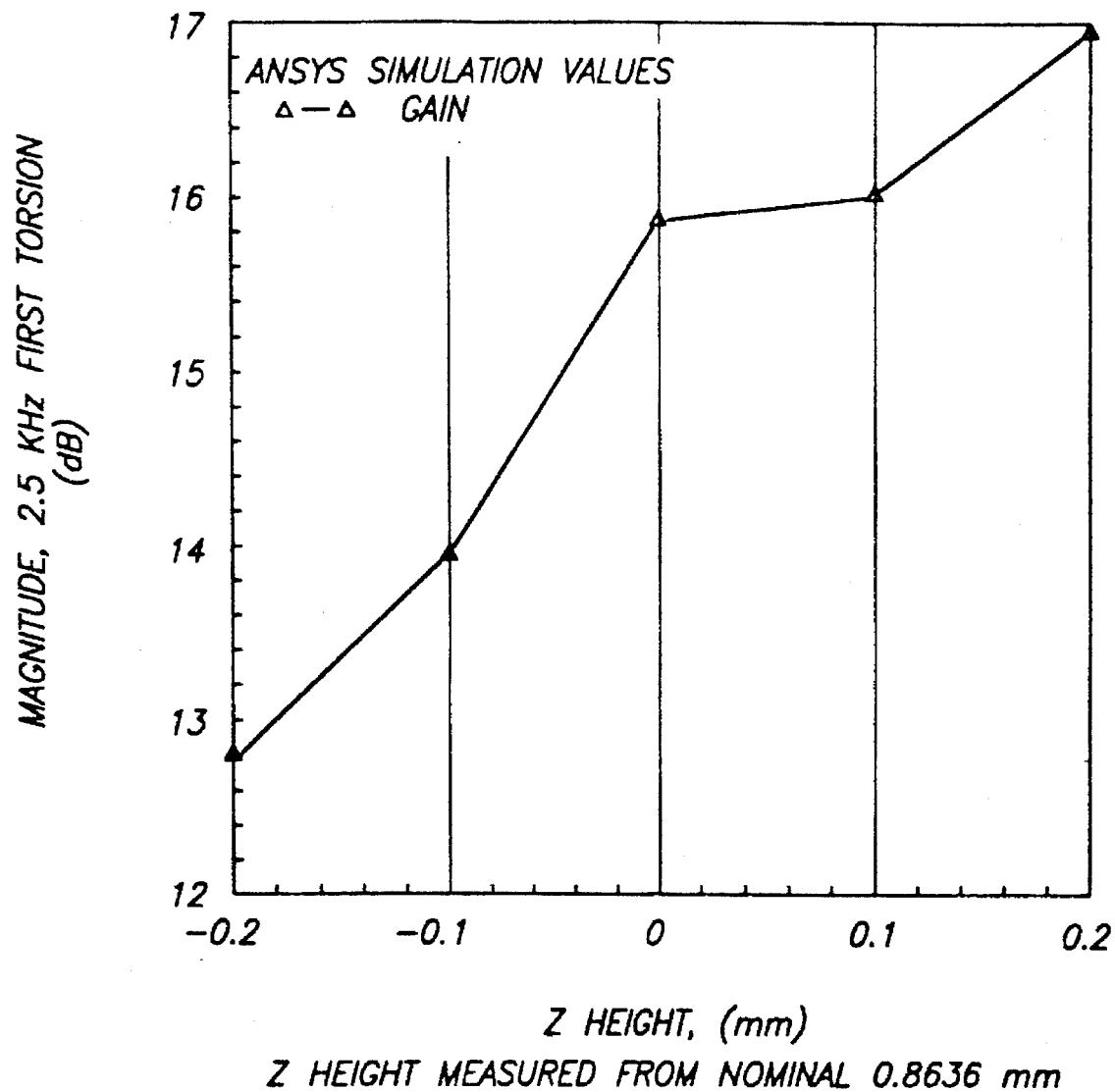
FIG. 18 is a graph showing amplification at the resonant frequency of the first torsional mode of the type-8 HGA as a function of change in Z-height parameter.

The change of Z-height can also effect the amplification at the 1st is torsional mode, but to a lesser degree as shown in FIG. 18. By "Z-height" is meant the height dimension as measured from the top of the load beam at location 54 adjacent to the swage plate 18 (see e.g. FIG. 4C) to a plane including the bottom surface of the slider 12 when it is loaded onto the rotating disk surface. As illustrated by the FIG. 18 graph, the amplification of the excitation energy at e.g. 2.5 kHz increases with increasing Z-height change, and decreases with decreasing Z-height, for a type-8 HGA, from a nominal reference of 0.8636 mm. FIG. 18 also illustrates that the bump and offset parameters must be optimized for a given Z-height parameter.

Figure 7A:
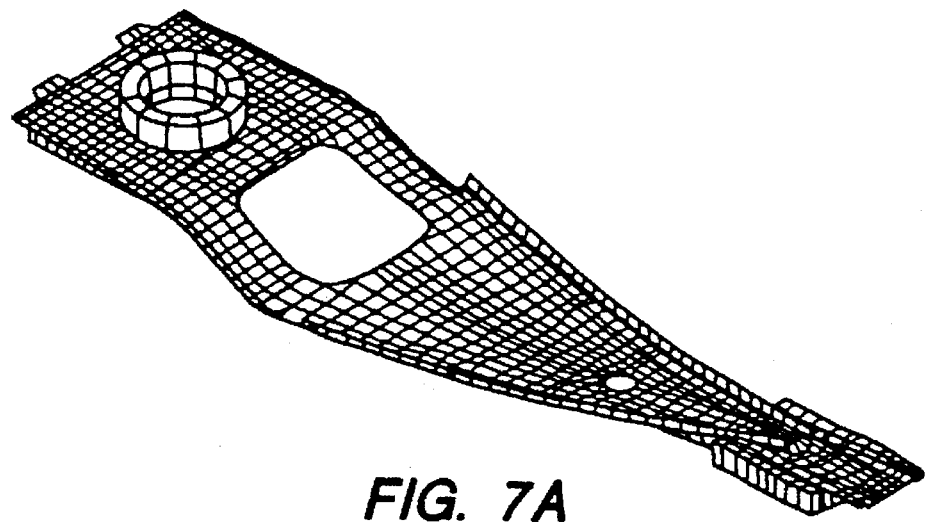
FIGS. 7A, 7B and 7C are respectively enlarged finite element models of the first bending mode, first torsional mode and first sway mode resonances of the type-8 HGA in accordance with principles of the present invention.
Figure 7B:
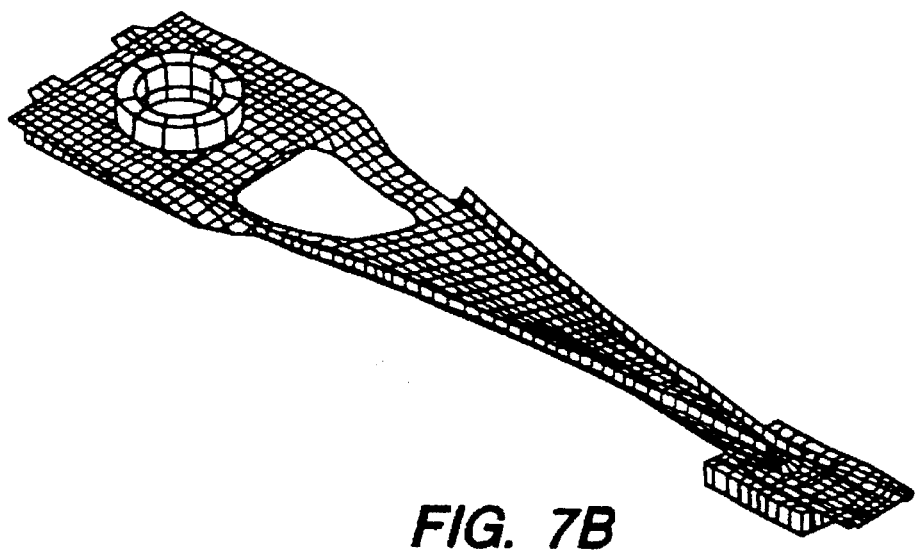
Figure 7C:
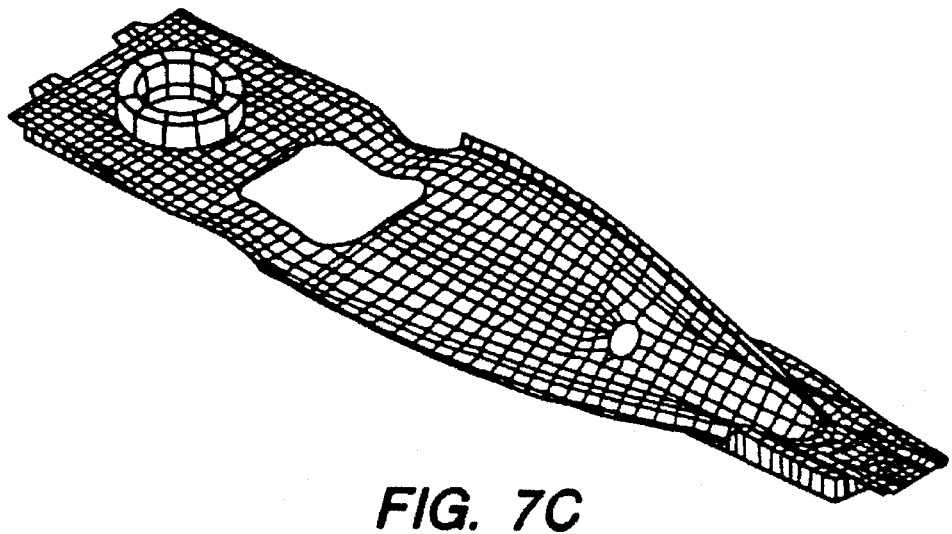

Once the HGA is fully characterized, as by the finite element analysis methods illustrated in FIGS. 7A, 7B, and 7C, and optimal offset and bump parameters are determined for a particular resonance, such as 1st torsional resonance, a method to be described can be employed to produce the desired load beam spring section contour with these optimal offset and bump parameters.

Fabrication Method

Figure 19A:
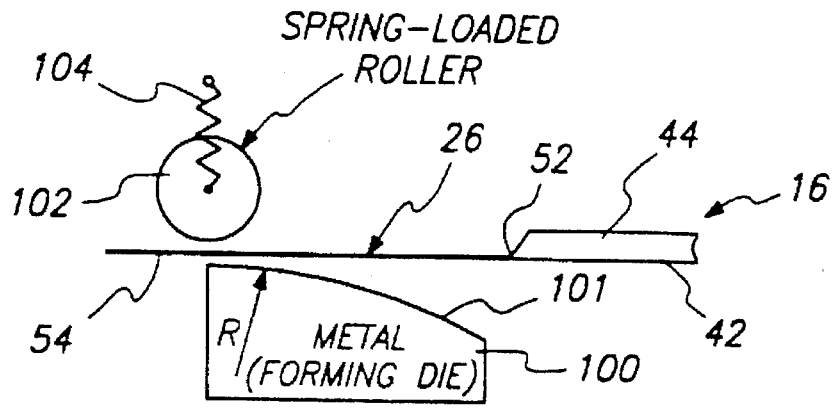
FIGS. 19A, 19B and 19C are respective views of three progressive forming steps of a load beam forming process using a spring-loaded roller.
Figure 19B:
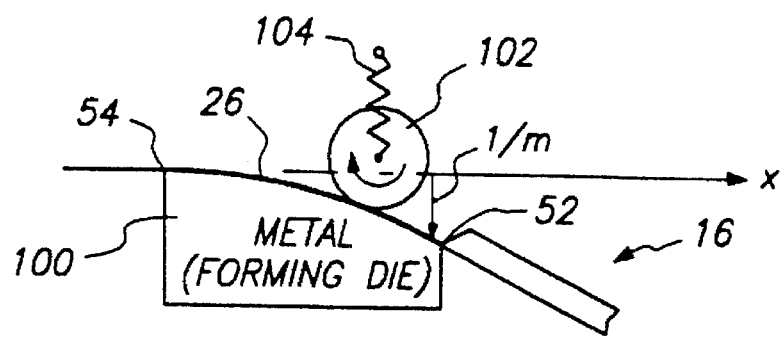
Figure 19C:
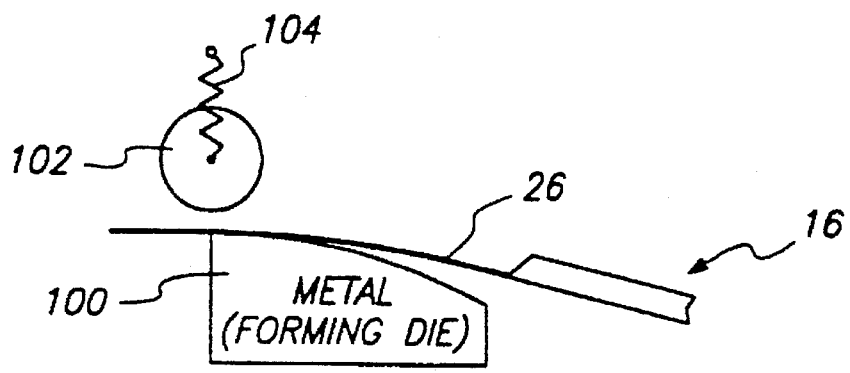

One way to produce the desired gram load is to plastically deform an initially flat load beam 18 against a forming die, such as the die 100 shown in FIGS. 19A, 19B and 19C. The initially flat load beam 16 as shown in FIG. 19A, is secured in place relative to a forming contour 101 of the die 100 at the location 54, so that a portion of the unformed load beam to be Secured to the swage plate e.g. by spot welding overhangs the left side of the die 100 as shown in FIG. 19A. A forming roller 102, which may apply a predetermined forming force to the unformed load beam and force it into conformance with the contour 101 of the die 100, may be provided with a loading spring 104 and with a suitable mechanism (not shown) to cause it progressively to roll over the load beam spring region 26, beginning from location 54 of the load beam 16 and extending to location 52 of the load beam adjacent to its reinforced section 42 (as shown in FIG. 19B), and then back to the point of beginning (as shown in FIG. 19C). As a consequence of the forming operation shown in FIGS. 19A–C, the spring section 26 is plastically deformed into conformance with the forming contour, and then springs back to a formed contour (which is not flat) as shown in FIG. 19C. This formed contour provides the desired gram load and also manifests the optimized bump and offset parameters to the load beam after the HGA of which it is an integral part is loaded into operating position relative to the spinning disk.

Figure 20A:
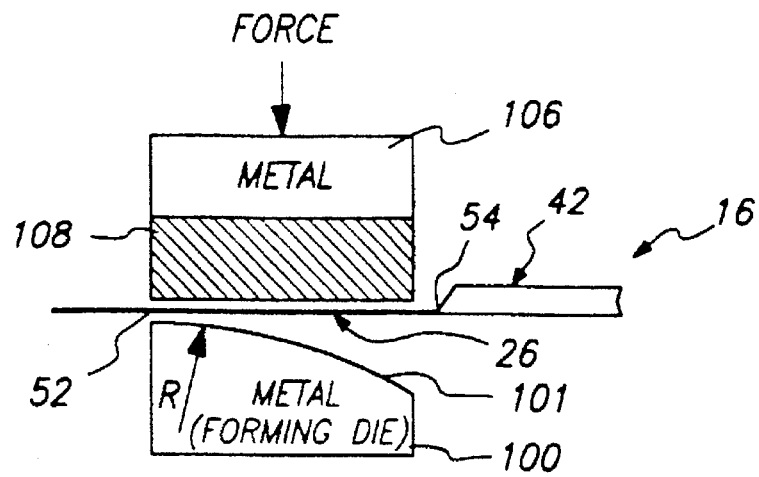
FIGS. 20A, 20B and 20C are respective views of three progressive forming steps of a load beam forming process using die compression.
Figure 20B:
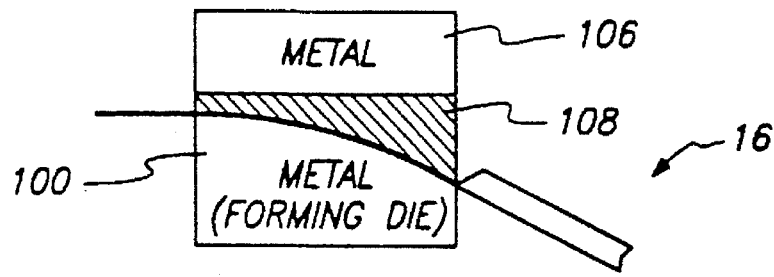
Figure 20C:
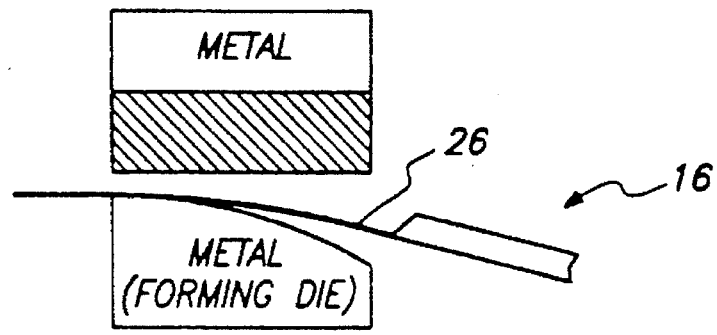

Alternatively, the initially flat load beam 16 may be secured in position relative to a pressure-providing die arrangement, as shown in FIGS. 20A, 20B and 20C, for example. In this example, the die 100 and forming contour 101 are optimized in accordance with the method of the present invention. A complementary upper forming die 106, which may carry a suitable elastomeric layer 108 of e.g. rubber, is in registration with the die 100. A downward driving force is applied to the upper forming die 106 as denoted by the arrow and FORCE label in FIG. 20A. The initially flat load beam 16 has its spring section pressed into conformance with the forming contour 101 of the forming die 100 by the pressure applied to and through the upper forming die 106 and elastomeric layer 108. This method also permanently deforms the spring section, as shown in FIG. 20C, such that the load beam 16 provides the desired gram load and also manifests the optimized bump and offset parameters when loaded in the operating state as part of a HGA.

Irrespective of the precise forming method, after forming, the load beam spring section 40 is deformed, and the load beam 16 does not spring back to the flat state because of the plastic curvature developed along the spring section during the forming process. The gram load is then the force applied at the dimple position 46 to bend the load beam 16 to the loaded state (or the operating state). The profile of the forming die determines the magnitude of the plastic curvature imposed in the load beam in the forming process and therefore the gram load when loaded in the loaded state. This second part of the present disclosure teaches methods of systematic calculation to determine the shape and contour of the forming die in order to produce a load beam 16 having desired bump and offset characteristics and at the same time providing the required gram load to the slider 12.

The calculation procedure is summarized by the following steps:

Step 1. Calculate backwardly the plastic curvature required along the spring section 40 of the load beam 16 in its unloaded state from given load beam specifications and parameters including material thickness, dimensions, any desired bump, offset, and gram load requirement of the load beam 16 in its loaded state.

Step 2. Calculate the total bending curvature along the length of the spring section 26 of the load beam 16 which is required to produce the plastic curvature obtained by step 1.

Step 3. Calculate the profile of the forming die according to the total bending carvature obtained by step 2.

The mathematical setting of the above calculation procedure may be summarized as follows.
Step 1:

The shape of the load beam in loaded state, denoted as $y_1$, is uniquely determined by the plastic curvature along the spring section 26 of the load beam 16 developed in the forming process denoted as $k_p(x)$ hereafter. $y_1$ and $k_p(x)$ can be related by any one of the following two methods, for example.

Figure 21:
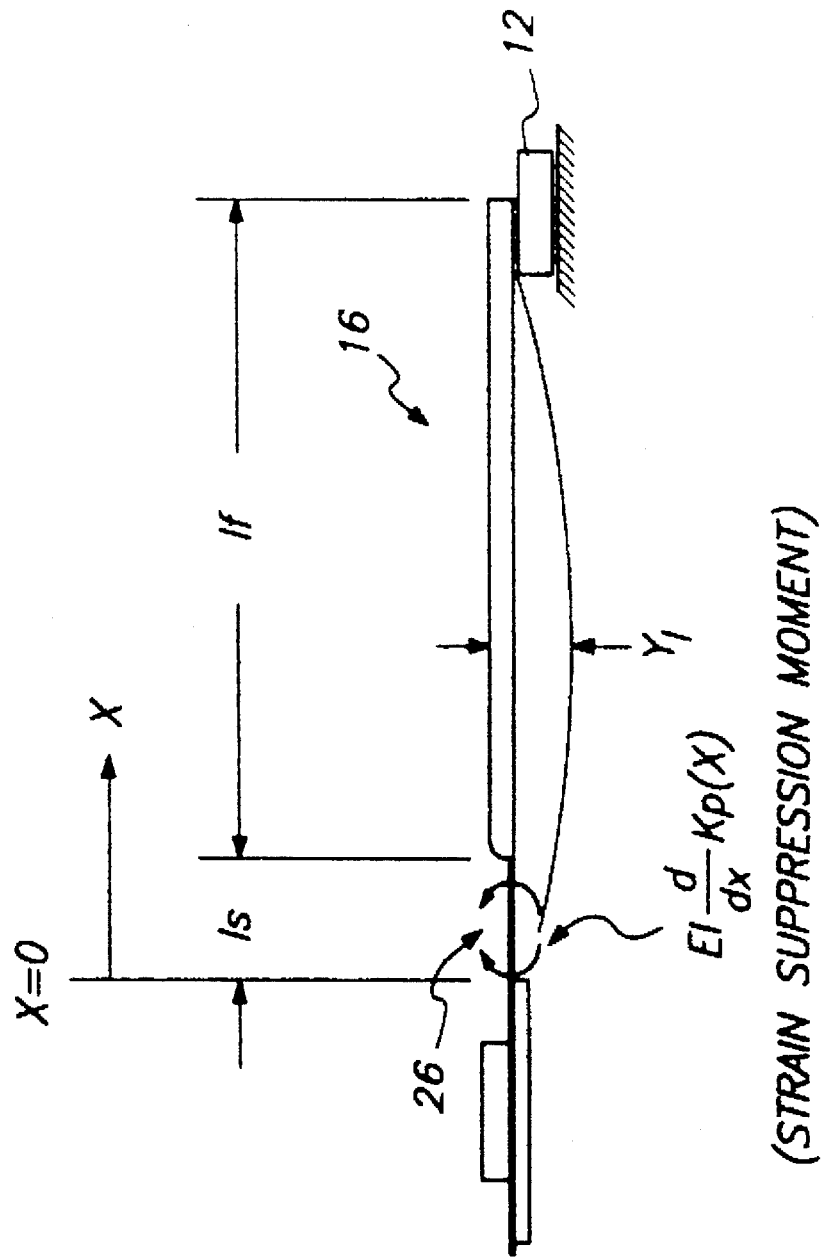
FIG. 21 is a diagram of a nominal HGA identifying parameters used in a mathematical model of the HGA in the loaded state in accordance with principles of the present invention.

The first method provides a linear approach. By regarding the load beam as a beam and by applying the theory of strain suppression, $y_1$ can be related to $k_p(x)$ by the equation $$\frac{d^2 y_l}{dx^2} = -\frac{d}{dx} k_p(x) \tag{1}$$

subjected to boundary conditions respectively at locations 54 and 52 of the load beam spring section 26:

$$y_1(0)=y'_1(0)=0 \text{ and } y_1(l_s+l_f)=y''_1(l_s+l_f)=0 \tag{2}$$

where $l_s$ and $l_f$ are the length of the spring section and ranged section of load beam separately; see FIG. 21. Equation (1) states that the loaded shape is governed by the gradient of the plastic curvature along the spring length. The bump and offset are describable as $$\text{offset} = y_l(l_s), \tag{3}$$

and $$\text{bump} = y_l\left(\frac{1}{2} l_s\right) - \frac{1}{2} y_l(l_s) \tag{4}$$

The gram load required at the slider in the loaded state is $$\text{gram\_load} = EI \frac{d^4 y_l}{dx^4} (l_s + l_f) \tag{5}$$

where H is the bending rigidity of the spring section. The plastic curvature $k_p(x)$ can then be solved from equation (1) subjected to boundary conditions (2), bump, offset and gram load requirements (3), (4) and (5).

A second method follows a non-linear approach. Given any plastic curvature along the spring section 26, the shape of the load beam in the unloaded state, denoted as $y_u$, can be determined by integrating $$\frac{y''_u}{(1+y'^2_u)^{3/2}} = k_p(x) \tag{6}$$

with initial condition $$y_u(0)=y'_u(0)=0 \tag{7}$$

The load beam is then deformed to the loaded state by displacing the dimple to the operating height with a concentrated vertical force at the dimple. The displacement traversed by the load beam in this loading process could be 10 to 100 times the thickness of the load beam. Problem of this kind falls in the category of nonlinear mechanics and requires a nonlinear solution scheme. That is, an iterative solution scheme is required. The solution process is available in solid mechanics book such as "Mechanics of Materials" by Timoshenko and Gere. Method 1 is a linear approximation of this loading process and is accurate for applications with small Z-height. As with method 1, the bump and offset are describable as equations (3), (4) according to the shape in the loaded state. The gram load is the vertical load force applied at the dimple position and can be determined in the non-linear solution process.

Figure 22:
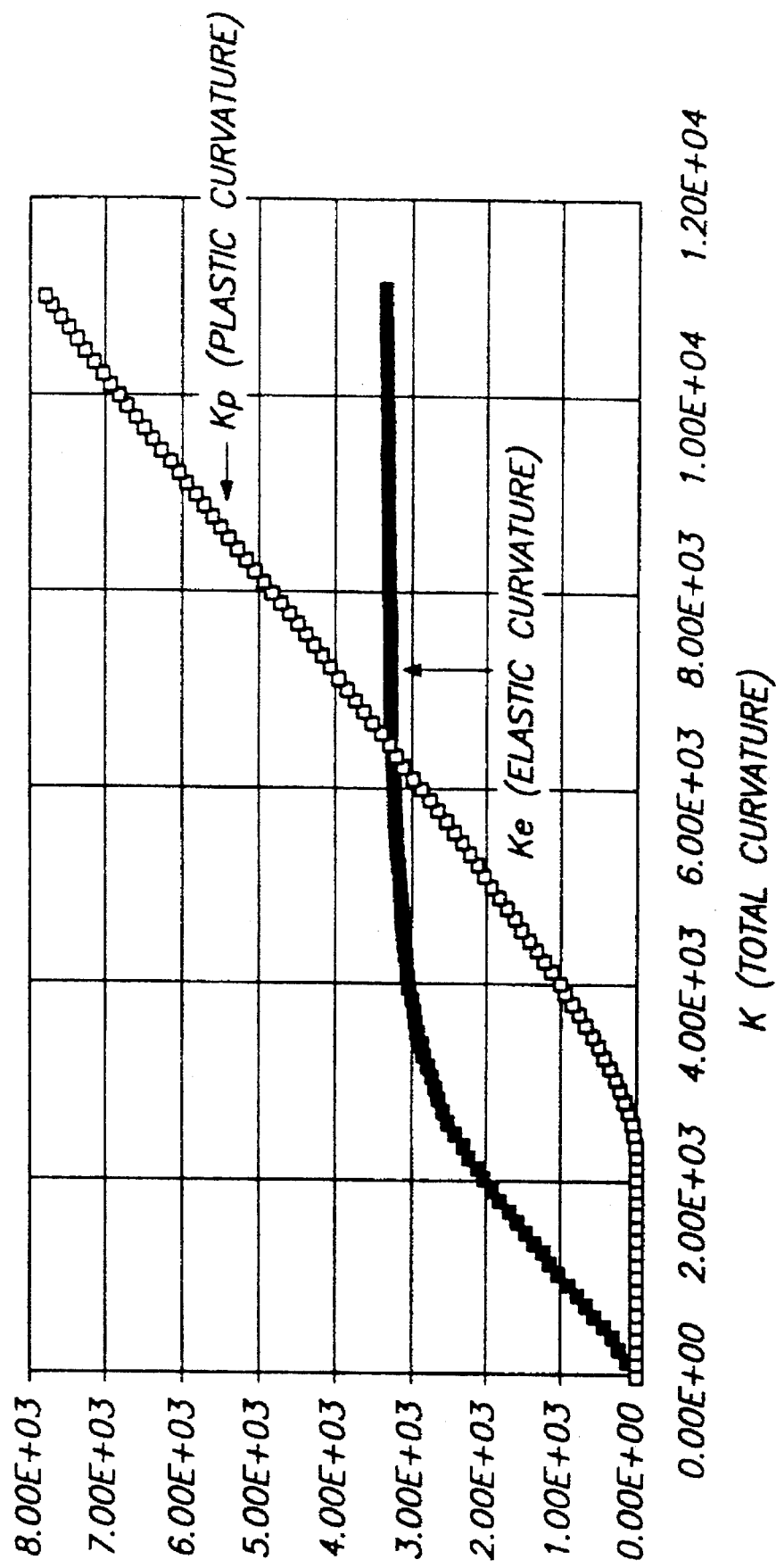
FIG. 22 is a graph illustrating a non-linear relationship between plastic curvature and total curvature of the type-8 HGA, with yield stress equal to 200 KSI.

Although the solution process in non-linear, the gram load, bump and offset in loaded state are uniquely determined for any given plastic curvature. Plastic curvature distribution along the spring section can be chosen such that the gram load requirement, (3) and (4) are satisfied.
Step 2:

The total bending curvature, $k(x)$, required to produce plastic curvature $k_p(x)$ is then calculated from the spring section dimensions and the material mechanical properties. For beam like spring section with perfect plastic yielding property, $k(x)$ and $k_p(x)$ can be related by the following nonlinear relationship $$k_p = k + \frac{b\sigma_y^3}{3IE^3} k^{-2} - \frac{bh^2 \sigma_y}{EI} \tag{8}$$

where $\sigma_y$ is the yield stress, b is the width of the spring section, h is one half of load beam thickness, $I=2bh^3/3$ and E is the Young's modules of the load beam material. FIG. 22 shows the graphical representation of (8) for a type-8 HGA with $\sigma_y=200$ ksi.

Step 3:

The forming die profile, $y_m$, can be calculated by integrating $$\frac{y''_m}{(1+y'^2_m)^{3/2}} = k(x) \quad (9)$$

with initial condition $$y_m(0) = y'_m(0) = 0 \quad (10)$$

Figure 23:
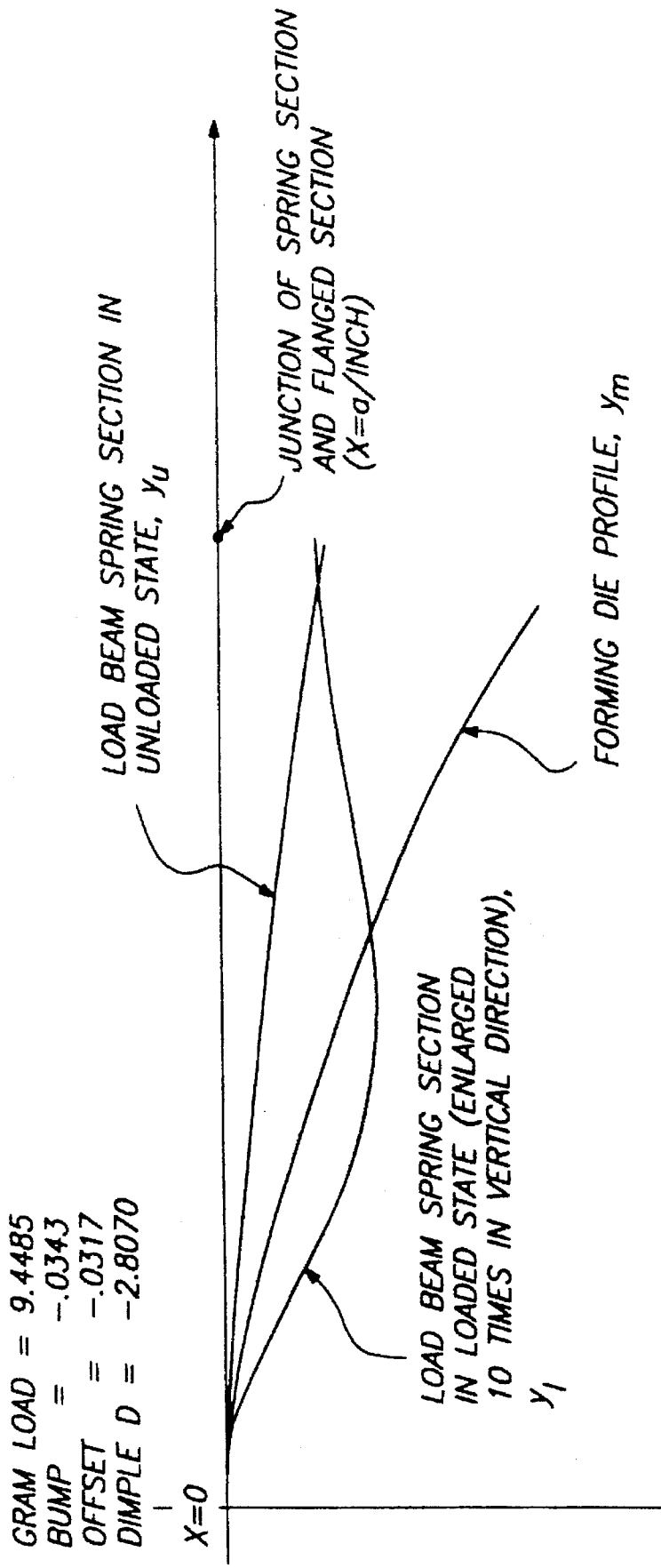
FIG. 23 is a series of graphs showing the longitudinal contours of the spring section of the type-8 HGA in the loaded state and unloaded state and the forming contour of the forming die for forming the type-8 HGA spring section to have a bump of −0.0343 mm and an offset of −0.0317 mm, in accordance with principles of the present invention.
Figure 24:
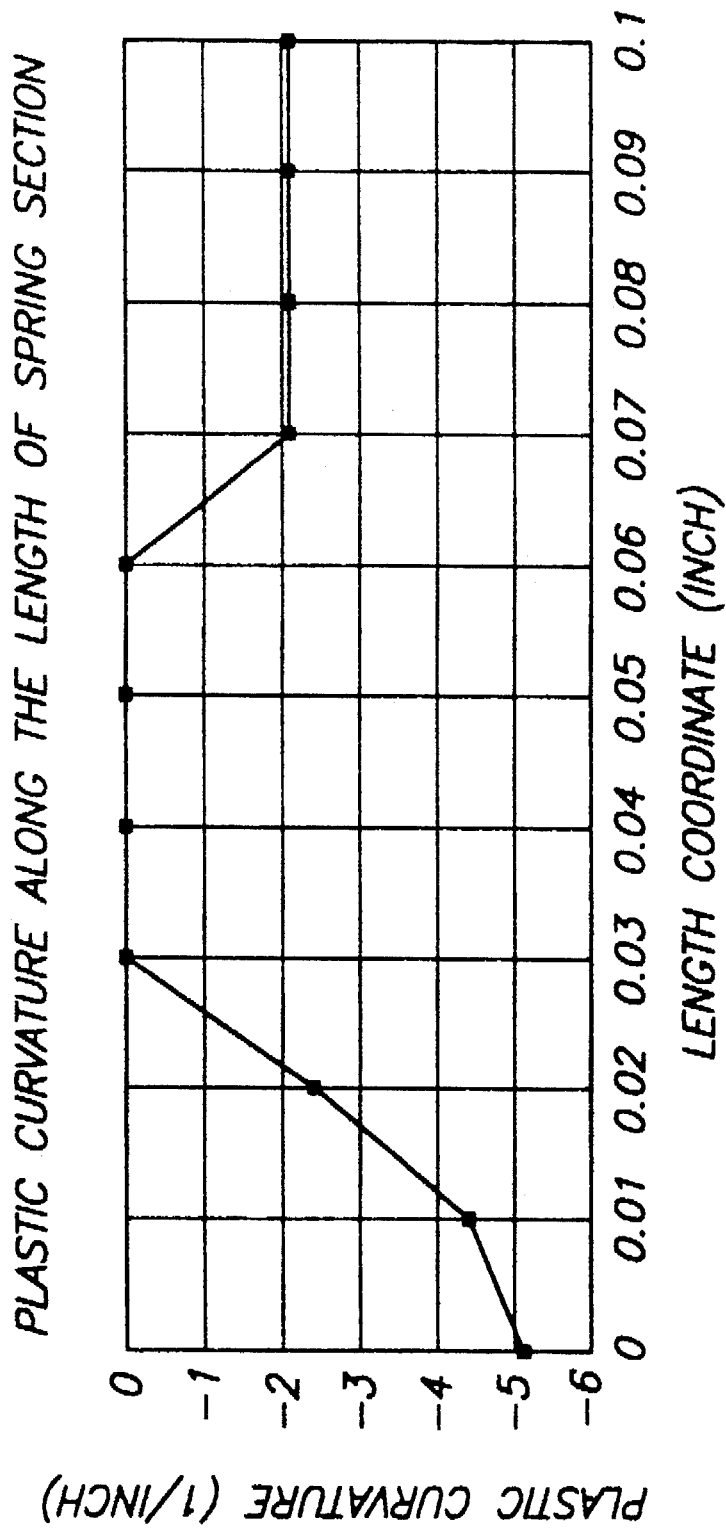
FIG. 24 is a graph illustrating calculated data points of plastic curvature along the length of the spring section of the type-8 HGA.

FIG. 23 shows the shapes of the spring section 26 of the load beam 16 in the loaded state, unloaded state and the state on the forming die separately with offset=bump=-0.03 mm for type-8 HGA. FIG. 24 shows the magnitude of required plastic curvature along the length of the spring section.

Optimization of the Forming Die Profile

Theoretically, there are infinitely many solutions to equation (1) satisfying (2), (3), (4) and (5). That is, there are infinitely many forming die profiles 101 that can meet the offset, bump and gram load requirements of a particular load beam design. This non-uniqueness property is favorable because it allows for the freedom of choosing the best forming die profile among available options. In other words, optimization of forming die profile 101 is possible.

The plastic curvature $k_p(x)$ can be parameterized as follows.

$$k_p(x) = k_1 f_1(x) + k_2 f_2(x) + \ldots + k_n f_n(x) \quad (11)$$

where $f_i(x)$ are the plastic curvature shape functions defined along the spring section of the load beam, $k_i$ are the coefficient of each shape function and are called parameters hereafter. The optimization of the forming die profile is to solve for those parameters in a least square sense or according to any optimization criterion under constraint equations (1), (2), (3), (4) and (5).

The following are some examples of optimization criteria:

1. Optimize to the offset and bump most insensitive to material yield stress variation.
2. Optimize to the offset and bump most insensitive to certain suspension dimensions, such as load beam thickness.
3. Optimize to a forming die profile 101 which is most machinable, i.e., most readily realizable with a given machining technique or process.

The shape function can be globally defined along the whole length of the spring section, such as a Fourier series type $$k_p(x) = \sum_{i=1}^{n} k_i \sin(x/l_1) + k_{i+1} \cos(x/l_1)$$

or locally deemed, such as the finite element type $$k_p(x) = \sum_{i=1}^{n} k_i f_i(x)$$

where $f_i(x)=1$ for a short length and 0 elsewhere. The shape functions and number of shape function can be customarily defined according to the selected optimization criterion for the best result.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A load beam having tuned resonance mode performance for supporting a read/write head adjacent to a rotating disk in a disk drive having an actuator arm movable relative the disk, the load beam comprising:
   a connection portion at a proximal end of the load beam for attaching the load beam to the actuator arm;
   an arc shaped spring portion distal to and extending from the connection portion; and
   a reinforced portion distal to and extending from the spring portion for supporting the read/write head at a distal end thereof, wherein said arc shaped spring portion extends from the connection portion to the reinforced portion in one continuous arc which is curved in only one direction when the load beam is in a loaded configuration and the reinforced portion is configured with the distal end thereof being closer to the rotating disk than a proximal end thereof.

2. The load beam of claim 1, wherein the spring portion arcuately extends towards the rotating disk.

3. The load beam of claim 1, wherein the reinforced portion comprises a generally planar central member and an upwardly facing reinforcing flange along a portion of a lateral edge of the central member, the flange extending from the central member and away from the disk.

4. The load beam of claim 1, wherein the reinforced portion comprises a generally planar central member and a downwardly facing reinforcing flange along a portion of a lateral edge of the central member, the flange extending from the central member and toward the disk.

5. The load beam of claim 1, wherein the spring portion arcuately extends away from the rotating disk.

* * * * *